United States Patent
Piszczek et al.

(10) Patent No.: US 8,719,520 B1
(45) Date of Patent: May 6, 2014

(54) SYSTEM AND METHOD FOR DATA MIGRATION BETWEEN HIGH-PERFORMANCE COMPUTING ARCHITECTURES AND DATA STORAGE DEVICES WITH INCREASED DATA RELIABILITY AND INTEGRITY

(75) Inventors: Michael J. Piszczek, Laurel, MD (US); Cedric T. Fernandes, Columbia, MD (US); Dave F. Fellinger, Westlake Village, CA (US); William Joseph Harker, Columbia, MD (US); John Gordon Manning, Ellicott City, MD (US); Lee Douglas McBryde, Mount Airy, MD (US); Pavan Kumar Uppu, Laurel, MD (US); Manjari Mishra, Rosedale, MD (US); Thomas Edward Fugini, Mount Airy, MD (US); Shivkumar Pandit, Elkridge, MD (US); John Albert de Leon, Columbia, MD (US)

(73) Assignee: DataDirect Networks, Inc., Chatsworth, CA (US)

( * ) Notice: Subject to any disclaimer, the term of this patent is extended or adjusted under 35 U.S.C. 154(b) by 690 days.

(21) Appl. No.: 12/967,577

(22) Filed: Dec. 14, 2010

(51) Int. Cl.
 *G06F 12/02* (2006.01)
(52) U.S. Cl.
 USPC .......................................... 711/161; 709/219
(58) Field of Classification Search
 USPC .......................................... 711/161; 709/219
 See application file for complete search history.

(56) References Cited

U.S. PATENT DOCUMENTS

| | | | |
|---|---|---|---|
| 7,477,477 B2 * | 1/2009 | Maruchi et al. | 360/78.08 |
| 2003/0145270 A1 * | 7/2003 | Holt | 714/766 |
| 2007/0288692 A1 * | 12/2007 | Bruce et al. | 711/113 |
| 2010/0306448 A1 * | 12/2010 | Chen et al. | 711/103 |
| 2010/0325522 A1 * | 12/2010 | Tsukamoto et al. | 714/770 |
| 2011/0202708 A1 * | 8/2011 | Ash et al. | 711/103 |

\* cited by examiner

*Primary Examiner* — Jared Rutz
(74) *Attorney, Agent, or Firm* — Rosenberg, Klein & Lee

(57) ABSTRACT

A system for data migration between high performance computing architectures and data storage disks includes an intermediate data migration handling system which has an intermediate data storage module coupled to the computer architecture to store data received, and a data controller module which includes data management software supporting the data transfer activity between the intermediate data storage module and the disk drives in an orderly manner independent of the random I/O activity of the computer architecture. RAID calculations are performed on the data prior to storage in the intermediate storage module, as well as when reading data from it for assuring data integrity, and carrying out reconstruction of corrupted data. The data transfer to the disk drives is actuated in sequence determined by the data management software based on minimization of seeking time, tier usage, predetermined time since the previous I/O cycle, or fullness of the intermediate data storage module. The storage controller deactivates the disk drives which are not needed for the data transfer.

21 Claims, 26 Drawing Sheets

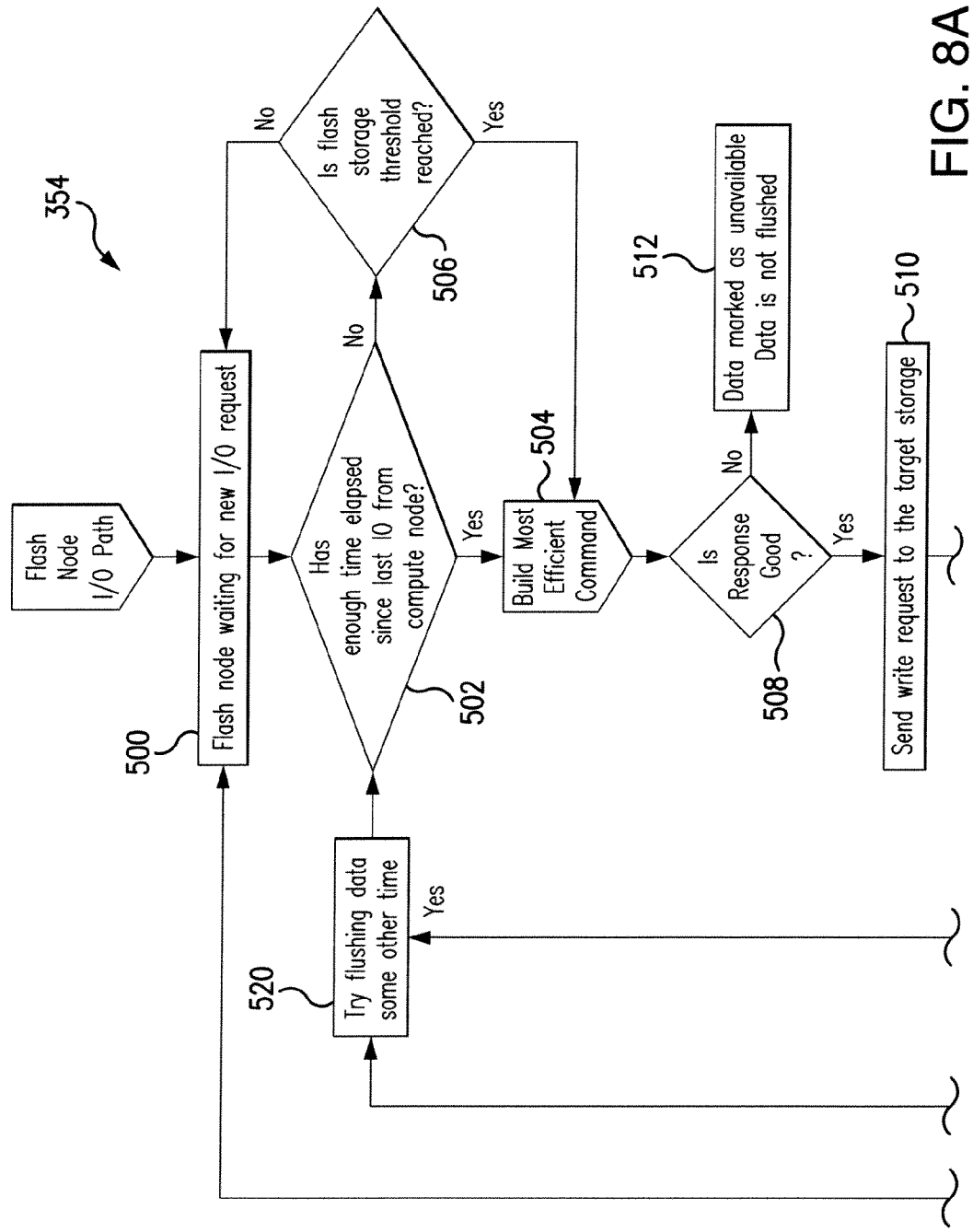

FIG. 16

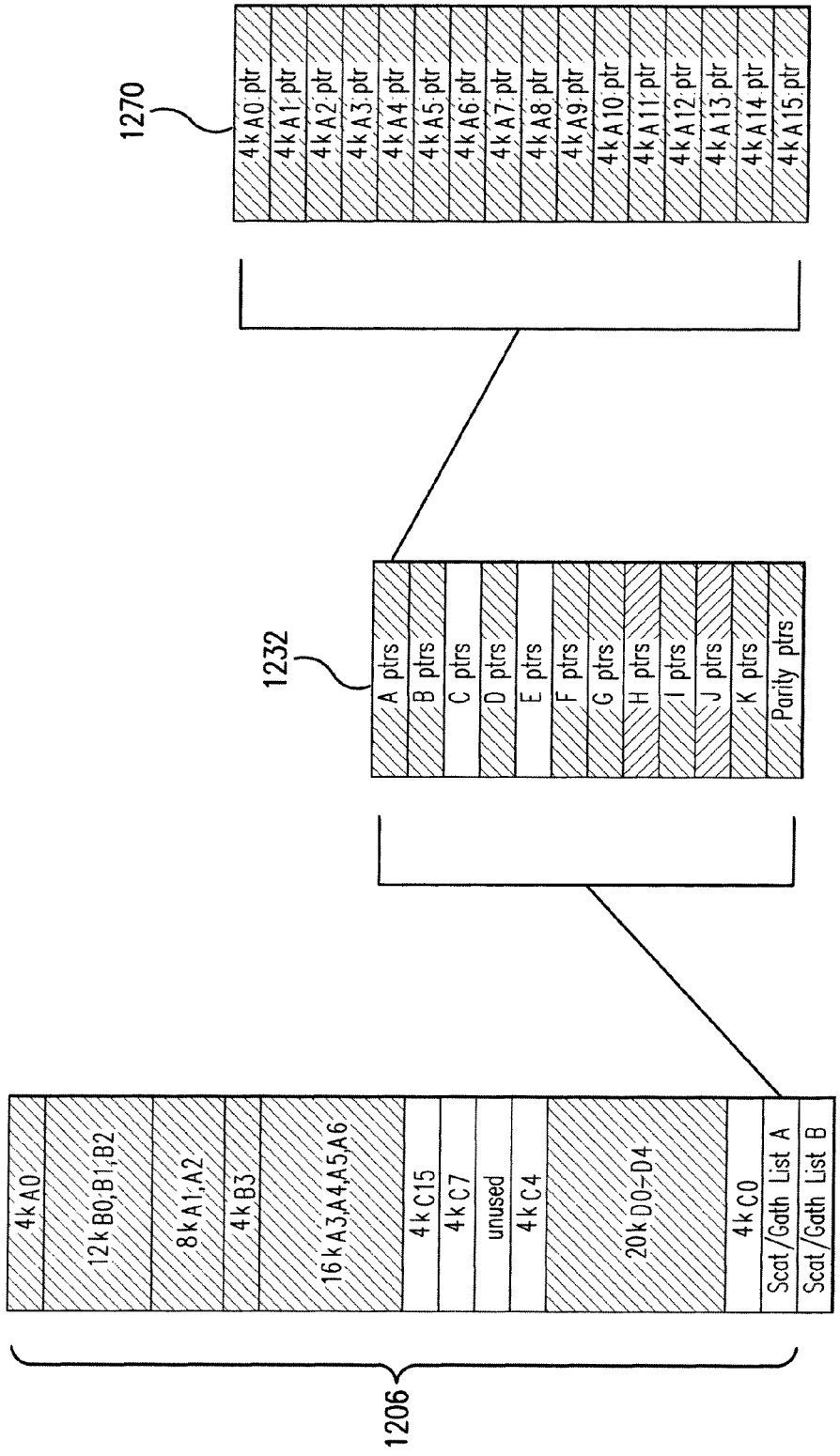

SYSTEM AND METHOD FOR DATA MIGRATION BETWEEN HIGH-PERFORMANCE COMPUTING ARCHITECTURES AND DATA STORAGE DEVICES WITH INCREASED DATA RELIABILITY AND INTEGRITY

FIELD OF THE INVENTION

The present invention is directed to data migration between high performance computing cluster architectures (data generating entities) and data storage disks, and particularly, the present invention relates to a data migration technique rendering an orderly access favored by data storage disks which is decoupled from a randomized input/output (I/O) activity of data generating entities.

More in particular, the present invention is directed to a data migration system employing an intermediate data migration handling system that performs high speed data caching into an intermediate data storage layer from data generating devices, aggregates and organizes the ingress and further controls migration of the cached data to a target data storage device in a manner that is most efficient for the target storage devices. When the data is stored in the intermediate data storage layer, the computing entity may return from the I/O state to the compute state without waiting for access to the target data storage device, thus minimizing the I/O cycle and improving the overall computing architecture's performance. The independent access of the egress data from the intermediate data storage device to the data storage devices attains bandwidth maximization and power consumption minimization.

The present invention is further directed to a data migration system in which an intermediate data migration handling system, which bridges the data generating architectures and data storage disks, performs RAID (Redundant Array of Independent Disks) calculations on the random ingress data received from the data generating architectures prior to storing the data thus providing data reliability and preserving the data integrity. The RAID calculations are also used when the data are "read" from the intermediate storage layer for data reconstruction of corrupted data, when found, and data integrity checking, when desired.

In addition, the present invention is directed to a data migration system which uses an intermediate data migration handling system in a modular configuration which is easily adaptable for servicing any number of data generating devices and easily installable between the data generating entities and the data storage disks.

The present system is also directed to a data migration system implemented with an intermediate data storage modular housing containing memory cards, the number of which may be changed in accordance with the size of the data generating architecture and needed memory space, as well as with a controller modular enclosure which houses a data migration controller virtualized on the storage controller of the disks array and RAID software. The modular implementation of the subject system provides for enhanced flexibility, and simplification in installation, while virtualization of the intermediate storage system on the storage controller in a single module results in reduction of operational costs.

The present invention is also directed to a system and method for storing "checkpoint" data produced by high performance computer cluster architectures which attains minimization of the disk drives power consumption and reduction of the disk "seeking" time by orderly scheduling the data "write" requests to the disk drive, thereby enhancing the performance of the target storage disks. Additionally, the input/output cycle of the computing clusters for "flushing out" the "checkpoint" data, while maintaining the data integrity and reliability, is shortened.

BACKGROUND OF THE INVENTION

Computer clusters, or groups of linked computers, have been broadly used to improve performance over that provided by a single computer, especially in extended computations, for example, involving simulations of complex physical phenomena. As shown in FIG. 1, in a computer cluster 10, computer nodes (also referred to herein as client nodes) 12 are linked by a high speed network 14 which permits the sharing of computers resources and memory. Data transfers to or from the computer nodes 12 are performed through the high speed network 14 and are managed by additional computer devices, referred to herein as File Servers 16.

The computer cluster 10 may assume either the compute state (or compute cycle) or the input/output (I/O) state (or I/O cycle), which are typically mutually exclusive. The process of moving data is carried out during the I/O cycle of the computer nodes 12, e.g., the data transfers are executed during time intervals when the computer activity has ceased.

In general, simulations of physical phenomena, and other complex computations, may run for an extended period of time lasting, for example, hours or even days. During the execution of a simulation, "checkpoint" data is written into the program so that, if the application software or hardware fails, the simulation may be restored from the "checkpoint". The "checkpoint" changes the state of the computer cluster from the compute state to the I/O state, to "write" the cache of the computer nodes to the attached File Servers which place the data in an orderly file system for subsequent retrieval. Since during the I/O cycle no actual computations occur, it is important to keep the I/O cycle as short as possible to maximize the overall computer duty cycle of the computer cluster.

The ratio of computer elements to File Servers is often very large and may exceed 1000 in some implementations. The File Servers 16 file data from multiple computer nodes 12 and assign a unique location for each computer node in the overall file system. Typically, the data migrates from the File Servers 16 to be stored on rotating media such as, for example, common disk drives arranged in storage disk arrays 18.

Since the File Servers 16 satisfy the requests of the computer devices 12 in the order that the requests are received, the disk drives appear to be accessed randomly as multiple computer devices may require access to the servers at random times. In this scheme, disk drives operate as "push" devices, and store the data on demand. Disk drives do not favor the regime of satisfying random requests since the recording heads have to be moved to various sectors of the drive (aka "seeking"), and this "seeking" movement takes a larger amount of time when compared to the actual "write" or "read" operation. To "work around" this problem, a large number of disk drives may be utilized that are accessed by a control system (storage controller) 19 which schedules disk operations in the attempt to spread the random activity over a large number of disk drives to diminish the effects of the disk head movement.

The size of computer clusters and the aggregate I/O bandwidths that is to be supported may require thousands of disk drives for servicing the computing architecture in order to minimize the duration of the I/O cycle. The I/O activity itself occupies only a short period of the overall "active" time of the disk system. Even though the duty cycle of write activity may occupy only a portion of the clusters total operational time, all the disk drives nevertheless are powered in expectation of the I/O activity.

It would therefore be beneficial to provide a data migrating technique between the computer cluster architectures and the disk drives which attains a shortened I/O cycle of the high performance computer clusters and an effective aggregate I/O bandwidths of the disk drives operation provided with a reduced number of disk drives activated for data storage, without excessive power consumption, and while maintaining data reliability as well as data integrity.

SUMMARY OF THE INVENTION

It is an object of the present invention to provide a data migration system in which an intermediate data migration handling system is installed between a data generating entity and an array of storage devices (disks) to decouple the random I/O activity favored by the data generating entity from orderly (non-random) data transfers to the data storage disks in a manner optimal for the disks exploitation.

It is a further object of the present invention to provide a data migration system in which data management software determines the most optimal and effective data transfer order between data generating architecture and storage disks via an intermediate data storage layer based on various criteria. Such criteria may include the fullness of the intermediate data storage layer, time elapsed from a previous I/O activity, minimization of usage of the storage disks, minimization of the "seeking" time, data transfer priority, etc.

It is another object of the present invention to provide a data migrating technique using an intermediate storage layer, in which the integrity of the data residing in the intermediate storage layer is periodically verified and is maintained during "READs" from the intermediate storage layer activated upon the "read" requests from the computer nodes or before the data is "flushed" to the target storage disks from the intermediate storage layer. In the event of data corruption, the corrupted or lost data may be reconstructed. The "read" requests are services only for uncorrupted data or data which is reconstructed using redundant information.

It is a further object of the present invention to provide a data migrating system with an improved duty cycle, increased effective bandwidth, and minimized power consumption for data migration between computer nodes and target disk drives by operatively coupling an intermediate data storage system to the data generating entity (computer nodes) which stores data received therefrom in their I/O cycle, and sends an acknowledgment to the computer node once all the I/O requests are completed, thereby allowing the computer nodes to return to the "compute" state while the data resides in the intermediate data storage system.

It is an additional object of the present invention to provide a data migration system and method in which an intermediate data migration handling system, which "bridges" the data computing entities to data storage disks, renders the RAID (Redundant Array of Independent Disks) protection of the data prior to "flushing" the same to the disks.

It is also an object of the present invention to provide a data migration system employing an intermediate data migration handling system designed as a modular structure easily installable between the data generating entity and the storage disks array and adaptable to any number of data generating units as well as the size of "write" and "read" requests.

It is a further object of the present invention to provide a data migration system which is flexible enough to permit data transfers between the data generating entities and disk drives either via an intermediate data storage layer or directly in a "pass-through" mode, assuming, however, the data integrity in both modes of operation is provided.

In overall concept, the present invention is directed to a system for data migration between at least one data generating entity and at least one array of data storage units (disks), where the data storage array is controlled by a storage controller. The subject system comprises an intermediate data migration handling system installed between the data generating entity and the array of data storage units to decouple data transfers to the data storage disks from input/output activity of the data generating entity.

The intermediate data migration handling system includes an intermediate data storage module operatively coupled to the data generating entity to store data received therefrom, and at least one data migration controller module operatively coupled between the intermediate data storage module and the array of data storage disks to control data transfers therebetween.

The data migration controller module includes the storage controller of the disk array and a data storage management unit operatively coupled between the intermediate data storage module and the storage controller to generate requests to the storage controller for data transfer between the intermediate data storage module and a designated data storage disk in an optimal manner substantially independent of the input/output activity of the data generating entity based on predetermined conditions of the intermediate data migration handling system and the disk array.

The predetermined conditions may include, but are not limited to, the fullness of the intermediate data storage module, time elapsed since a previous I/O activity of the data generating entity, minimization of the usage of the disks, reduction of the "seeking" time for disk drives, and data transfer priority.

The system also may operate in a "pass-through" mode, in which the I/O data requests of the data generating entity may by-pass the intermediate storage and be directly applied to the target storage, when desired. When the intermediate data migration controller module determines, based on pre-configured attributes of the I/O requests, that for efficiency reasons, and/or if the intermediate data storage module has exhausted its storage capacity, a command is issued for switching the system into the "pass-through" mode. In this mode, the incoming "write" requests are transferred directly to the target storage disk(s) provided that the data integrity is not compromised. This preserves the I/O performance of the system in question as a whole and prevents deadlocks. This scheme permits servicing orderly data transfer to the target storage disk(s), and allows the intermediate data migration handling layer to adjust and control the peak power requirements of the target storage disk(s), maximize the power savings, and manage the throughput.

The target storage disk(s) that are not used for the scheduled data transfers are spun down or are left in the deactivated state since they are not needed for data migration, thereby further reducing the power consumption in a large target storage environment. The intermediate data migration handling system additionally allows the usage of a lesser number of storage controllers than needed in traditional systems to ingest "checkpoint" data from computer clusters, thereby minimizing the operational cost of the system.

The intermediate data migration handling system provides Redundant Array of Independent Disks (RAID) data protection at high ingress speeds and communicates with the target storage disk(s) independently of the computer node requirements. Thus, a periodic verification of data integrity is performed by running a verification process over the data waiting for "flushing out" in the intermediate data storage module. In the event of detection data corruption within the tolerable limits, the data is reconstructed using redundant information. The reconstructed data is marked with "high flush" priority.

The data storage management unit schedules the data transfer activity between the intermediate data storage module and the target storage disk(s). The data storage management unit is software which runs on the data migration controller module. When the intermediate data storage module approaches the predetermined "fullness" (or capacity), or when sufficient time has elapsed since the last I/O cycle of the computer node (or data generating entity), the data storage management unit determines an optimal sequence of "flushing" the data from the intermediate data storage module to the target storage disk(s) based on several criterion such as, for example, flushing priority, minimized tier usage in the disks array, minimized disk "seeking" times, along with bandwidth maximizations. The optimized I/O activity of the target storage disk(s) may further result in power savings at the target disk storage system, when only the disk(s) which is (are) needed for the data transfers are activated.

The intermediate data storage module is designed as a modular structure having a modular enclosure which houses a number of data storage cards. The module is further provided with front end interfaces for coupling the data storage cards to the data generating entities, and with back end interfaces for communication with the data migration controller module(s).

Each of the data storage cards includes a Dynamic Random Access Memory (DRAM) and Flash Memory Unit, which is formed with a Non-Volatile Random Access Memory (NVRAM) for storing data. The number of the data storage cards in the modular enclosure may vary to correspond to the number of the data generating entities serviced by the intermediate data storage module. The size of the NVRAM may also vary depending on the system requirements, for example, the size of the I/O request.

The system incorporates a Field-Programmable Gate Array (FPGA) Controller residing on each data storage card. The FPGA Controller includes a Flash FPGA controller unit and a Redundant Array of Independent Disks (RAID) FPGA controller unit.

The Flash FPGA Controller unit is operatively coupled between the data generating entities and the Flash Memory unit. The RAID FPGA controller is operatively coupled between the data generating entity and the DRAM block.

The Flash FPGA Controller Unit includes:
a first PCIe interface unit coupled to the front end interface of the respective data storage card,
a Flash Control block operatively coupled to the Flash Memory Unit,
a first Work Order Interface unit coupled, at an input thereof, to the first PCIe interface unit, and at an output thereof, to the Flash Control block to command the data flow to/from the Flash Memory unit as requested by the data generating entity.

The RAID FPGA Controller Unit includes:
a second PCIe interface unit coupled to the front end interface of the data storage card,
a RAID operation block operatively coupled to the DRAM, and
a second Work Order Interface unit operatively coupled between the second PCIe interface unit and the RAID operation block to command the data flow to/from the DRAM unit as requested by the data generating entity.

The RAID operation block includes Parity/Data generation unit, RAID memory, and a Scatter/Gather Point List. The data is read from the DRAM into the RAID operation block for processing. The data read from the DRAM is transferred to the Flash Control block via the first and second PCIe interfaces upon a request issued by the Flash Control Unit. The RAID Parity Data are written into the DRAM as instructed by the second Work Order Interface Unit.

The RAID operation block locates and processes the parity/RAID data in the DRAM as specified by the Scatter/Gather Pointer List. Data are striped across a plurality of Flash Memory cards in the Flash Memory block. The Scatter/Gather Pointer List is placed into said DRAM to define how to reconstruct the fragmented (scattered) data in the DRAM.

The intermediate data storage module may connect to a single data migration controller module, or, alternatively, also to an additional (redundant) data migration controller module via an additional back end interface. The redundant arrangement provides for both "healthy" and "failover" data storage to increase malfunction protection in the subject system.

The data migration controller module includes a controller modular enclosure for housing the data storage management unit and the disks storage controller operatively connected each to the other. The data storage management unit is operatively coupled to the intermediate data storage module and is configured to control data "write" transfers to, as well as data "reading" from, the intermediate data storage module in an optimal fashion. The virtualized file servers, virtualized intermediate data storage controller node, as well as the storage controller software for disk(s) are combined in the controller modular enclosure, thus reducing the operational costs due to minimization of components of the system.

The data migration controller module includes a virtualized Redundant Array of Independent Disks (RAID) unit contained in the controller modular enclosure in operative connection with the intermediate data storage module and the data storage management unit. The RAID unit is configured to apply RAID calculations to data ingress from the data generating entity prior to "writing" in the intermediate data storage module.

As a part of the RAID calculations, the RAID unit generates parity values for ingress data. The RAID unit allocates space in the intermediate data storage module for the data (D) and the parity values (P).

The RAID unit also performs data reconstruction when "read" requests are serviced when corrupted or lost data is found in the intermediate data storage module. For the reconstruction operation, the RAID unit uses "healthy" redundant data stored in the intermediate data storage module.

The present invention is also envisioned as a method for data transfer between at least one data generating entity and a plurality of data storage units, for example, a disk array. The method comprises the steps of:
(a) operatively coupling an intermediate data storage module (also referred to herein as a flash node) to at least one data generating entity,
(b) operatively coupling at least one data migration controller module between the intermediate data storage module and the disks array. The data migration controller includes a data storage management unit (software) and a storage controller of the disk array,
(c) sending a "write" request from the data generating entity to the intermediate data storage module during an Input/Output (I/O) cycle of the data generating entity,
(d) generating parity values P to data D at the data migration controller module, (e) allocating space in the intermediate data storage module for the data D and parity values P, (f) writing the data D and parity values P in the allocated space in the intermediate data storage module, (g) upon meeting predetermined conditions, building, at the data storage management unit, a command for efficient data transfer from the intermediate data storage module to target disk the disk array, (h) sending "write" request to the storage controller, and (i) flushing the data D from the intermediate data storage module to the target disk upon receipt of a permitting signal from the storage controller.

The method preferably includes also the step of performing a validity check for the "write" request prior to storing the data D in the intermediate data storage module.

After receiving the "write" request from the data generating entity, the efficiency check is applied to the "write" request by comparing a length of the "write" request to a predefined length for efficiency, and the availability of memory space in the intermediate data storage module for the "write" request is checked.

The data storage management software unit appoints at least one designated data storage unit, determines an optimal sequence of data transfers from the intermediate data storage module, and schedules the data transfer requests in the optimal sequence.

If memory space is not available, or if the "write" request is shorter than the predefined length for efficiency, the data storage management unit switches to a "pass-through" mode, thereby passing said "write" request directly to the storage controller of the disk array.

After "writing" the data D and parity P in the intermediate data storage module, a signal is generated to the data generating entity to switch to the compute state, thereby reducing its I/O cycle.

When sufficient time has elapsed since the last I/O cycle of the computer node, and/or it is determined that the flash node had reached its pre-defined fullness, the data storage management system starts sending efficient write requests to the target storage. If the system is pre-configured to perform data verification then, before sending the "write" requests to the target storage disk(s), data verification is performed. If any corruption is seen, then the intermediate data migration handling system activates a process for reconstruction of the data. Upon the successful reconstruction of the data, the "write" requests are sent to the target storage disk(s). Otherwise, the data remains in the intermediate data storage module and it is marked as unavailable for further use.

In a particular application of the method in question, as an example, "checkpoint" data may be transferred to the intermediate data storage module from computer nodes by issuing "write" requests. The validity of the request is checked, and if the I/O request is valid, the data migration controller module performs the efficiency check. If the efficiency check is successful, the data transfer to the intermediate data storage module begins. If the efficiency check fails, and if the system is pre-configured to use the pass-through module, the I/O requests are directly sent to the target storage disk(s). Otherwise, a "bad" response is sent to a computer node and it must reschedule the I/O request.

The technique presented herein is capable of servicing both the "write" requests and "read" requests. When the data generating entity issues the "read" request, before the request is fulfilled, the system determines whether the requested file resides in the intermediate data storage module or on the target storage disk(s). If the file is not in the intermediate data storage module, then the request is serviced by the target storage using the pass-through mode.

If, however, the requested data is available in the intermediate data storage module, then the data is first verified (if the system is configured to perform the data verification) and is reconstructed, if possible, when there is data corruption. Subsequently, the valid data is serviced to the computer nodes requesting the data. If the data verification is not enabled, then it is assumed that the data is "good" and the "read" request is serviced.

If it is determined that the requested information is partially in the intermediate data storage module, and partially is stored on the target storage disk(s), the request is serviced from both entities according to the "write" requests received for the same data.

The data storage management software unit maintains information about "healthy" and "failed" components and thus helps in the allocation of the RAID stripe resources in the intermediate data storage module. The software also maintains the description of the data contained in a RAID stripe which is used for searching old requests or adding new ones for the I/O requests sent to the intermediate data migration handling system by the data generating architecture.

These and other objects and advantages of the present invention will be readily available upon reading the following detailed description of the preferred embodiments in conjunction with the Drawings Figures.

BRIEF DESCRIPTION OF THE DRAWINGS

FIGS. 5A1-5A2 and 5B1-5B2 are schematic representations of the alternative embodiments of the subject system employing redundant data migration controller modules;

FIGS. 8A-8B represent a flow-chart diagram of the "flushing" routine of the data from the intermediate data storage module to the storage controller;

FIG. 16 is a representation of the 64 KB striping of data across Flash Memory cards in an 11+1 RAIDS configuration in the system of the present invention; and FIGS. 17A-17C represent schematically the process of reconstruction of the fragmented data in stage buffer (FIG. 17A), as commanded by the Work Order function (FIG. 17B) in accordance with specifications of the Scatter/Gather Pointer List (FIG. 17C) defining a proper order of fragmented data reconstruction in the system of the present invention.

DETAILED DESCRIPTION OF THE PREFERRED EMBODIMENTS

Figure 2A:
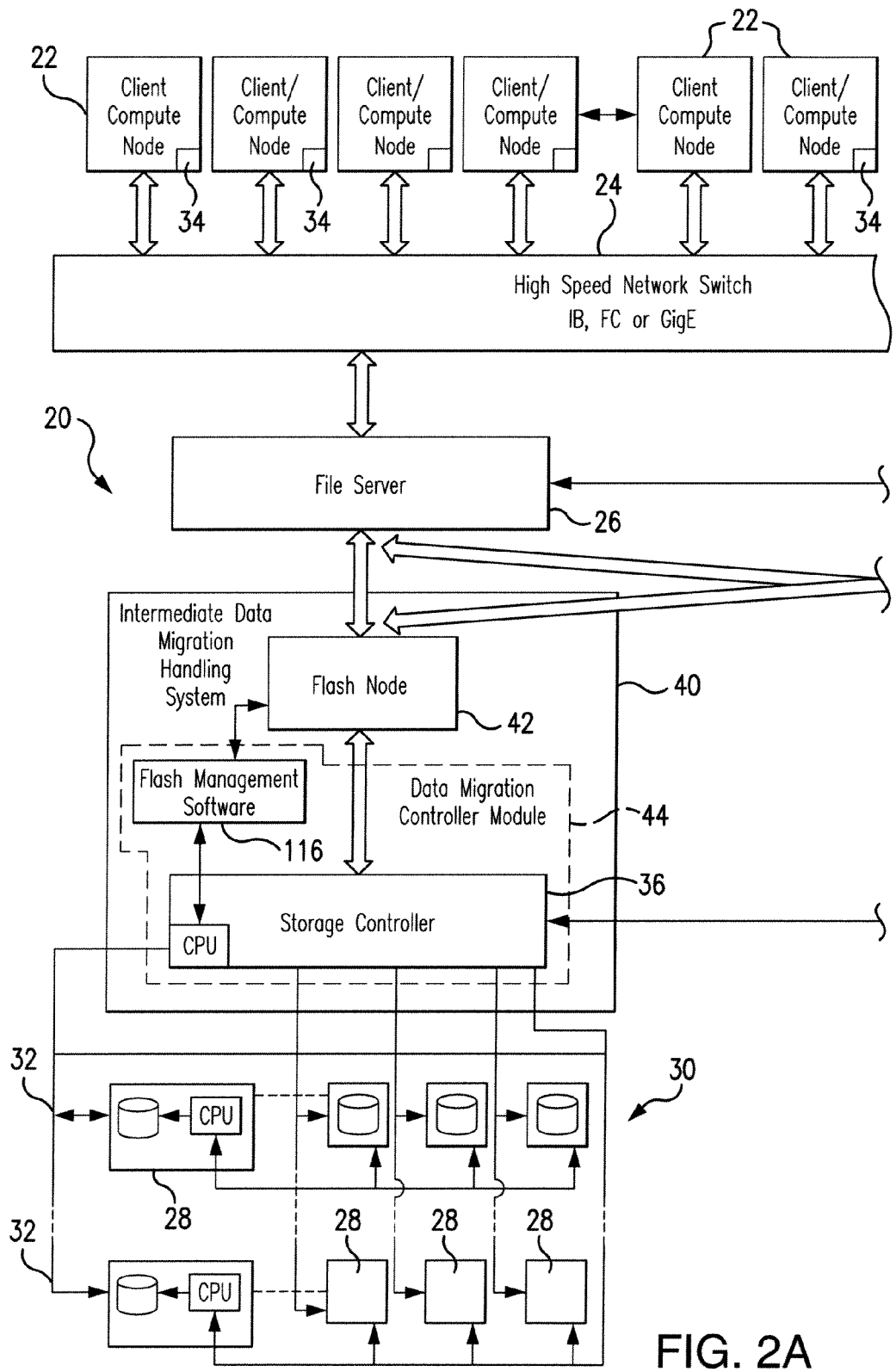
FIGS. 2A-2B represent schematically the data migration system of the present invention employing an intermediate data migration handling system.
Figure 2B:
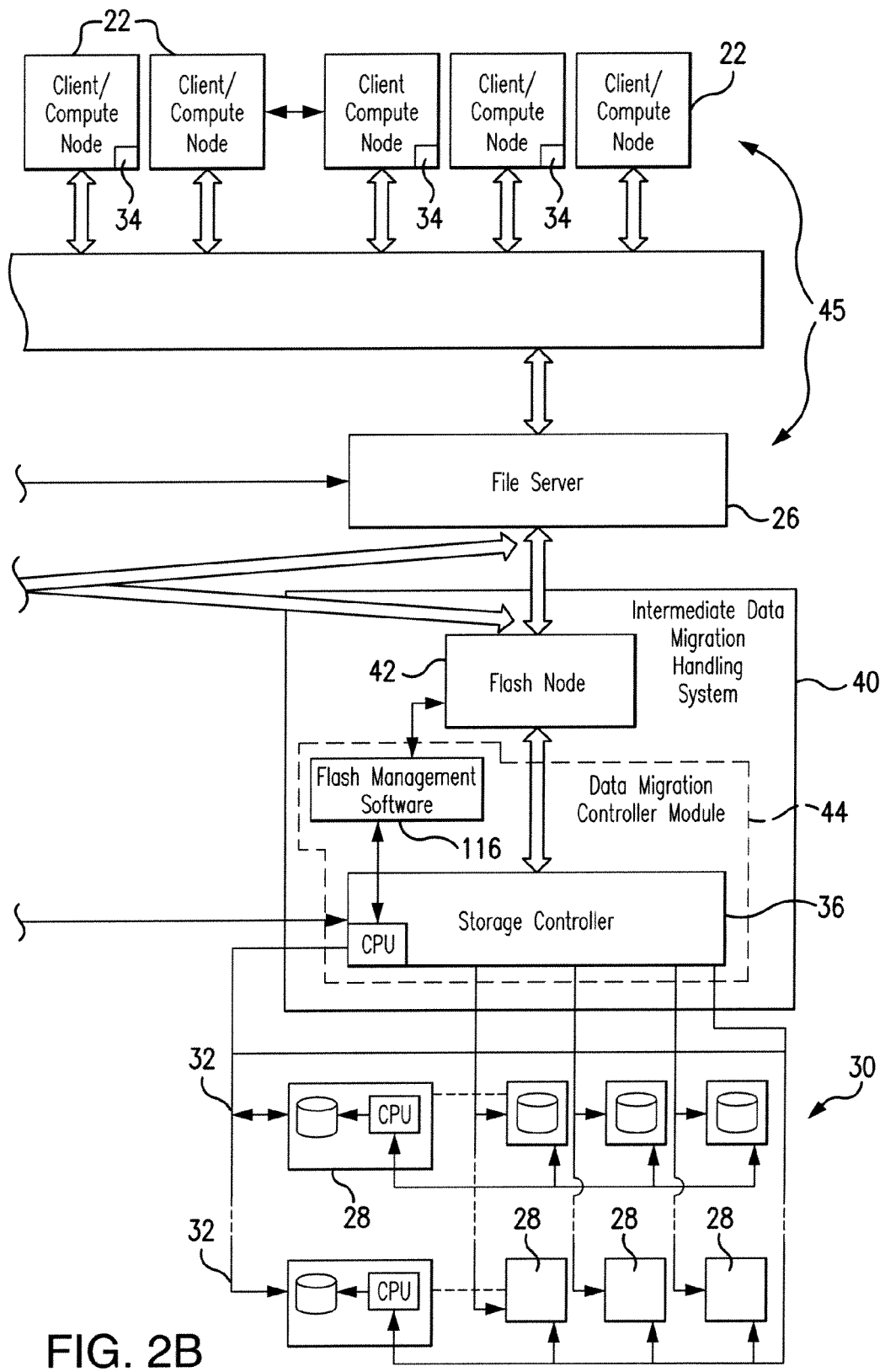

Referring to FIGS. 2A-2B, the system 20 of the present invention includes a number of computer nodes (or client nodes) 22. The computer nodes may be arranged in computing groups, or computer clusters, to perform complex computations of various types. The operation of the computer nodes depends on the system application. They may function as servers, super computing clusters, etc., and have the capacity to "write" by outputting data, as well as "read" from an external memory or any other device. In the present description the above-presented devices will be referenced further herein as data generating entities.

The computer nodes 22 are connected through a high speed network 24 to file servers 26 which manage data migration from and to the computer nodes 22. The ratio of the computer nodes 22 to the servers 26 may be in excess of a thousand in some applications. The file servers 26 satisfy requests of the computer nodes 22 in the same order as the requests are received at the file server. Therefore, the file servers receive data from the computer node 22 in a random fashion.

During the input/output (I/O) cycle the computer nodes operation, the data may be transferred from the computer nodes' cache to the file servers which may place data in the file system for subsequent retrieval. The high speed network 24 functions as a high speed switch and is capable of being based on any of the network transport protocols, such as, for example, Infiniband (IB), Fibre Channel (FC), and Gigabit Ethernet (GigE).

The system 20 is capable of handling any type of data transfer. However, for the sake of simplicity, and as an example, the following description of the system operation will be presented regarding the "checkpoint" data. The "checkpoint" data is the data which is written into the program during the execution of a simulation, with the purpose of restoration of the simulation from the "checkpoint", if the application software or hardware should fail.

Data retrieved from computer nodes, and/or file servers (combinably referred to herein also as data generating entities) are intended for being stored on disk drives 28 which may be arrayed in any format shown as storage disk array 30. The storage disk array may be arranged, for example, in the RAID (Redundant Array of Independent Drives) format. The RAID storage system 30 is a multi-dimensional array of disk drives 28 distributed in Read/Write tier groups 32 for storing data D and parity values P corresponding to the data stored in the array. Each tier group 32 in the array 30 constitutes a multiplicity of data disk storage channels.

Each computer node 22 has a software unit 34 which controls the operation of the computer node for the intended purposes and allocates I/O cycles during the execution of the computer node process for the "checkpoint". The "checkpoint" changes the status of the computer node from the computing mode into the I/O cycle when no actual computation takes place. Since the time of the I/O cycle allocated for the checkpoint is wasted from the overall duty cycle of the computer node, it is preferred that the I/O cycles be kept as short as possible in order to improve the computing duty cycle of the computer node.

The disk drives 28 must be spared from random operations, since in randomly granted access, the heads that record the data on the disks have to move over various sectors of the drive, thus taking a great deal of time (seeking time) compared to the actual write or read operation of the system.

A storage controller 36 controls the operation of the disks in the disk array 30. In the present system, the disk drives 28 are accessed in a sequential manner optimal for the disk drives exploitation, or in another efficient manner providing the uncompromised I/O performance of a storage controller 36 of the storage disk array 30. Disk drives 28 are provided with the capability of receiving data in the most efficient manner, so that the system 20 avoids the need for an excessive number of disk drives for storing the "checkpoint" data. Due to this, the disks which do not participate in data transfer, may stay deactivated, as controlled by the storage controller 36, for the period they are not accessed. This avoids excessive power consumption of the storage disk arrays 30.

The capability of storing the data at the disk drives in an orderly (or other efficient manner) in the system 20 is provided by utilizing an additional (intermediate) data migration handling system 40 operatively coupled between the computer nodes 22 (through the file servers 26) and the storage disk array 30 to enable an improved duty cycle with a shorter I/O cycle of the computer nodes operation. Additionally, this provides orderly data transfer to the disk drives 28 independently of the I/O cycles of the computer nodes 22. The intermediate data migration handling system 40 acts as a bridge between the highly random I/O activity favored by the computer nodes 22 (as well as by the file servers 26), and the orderly activity favored by the storage disk arrays 30.

The intermediate data migration handling system 40 includes an intermediate data storage module (further referred to herein intermittently as a flash node) 42, coupled to the computer nodes 22 through the file servers 26, both referred to herein intermittently as the data generating entity 45. The intermediate data migration handling system 40 further includes a data migration controller module 44 operatively coupled between the flash node 42 and the storage disk array 30.

Figure 3A:
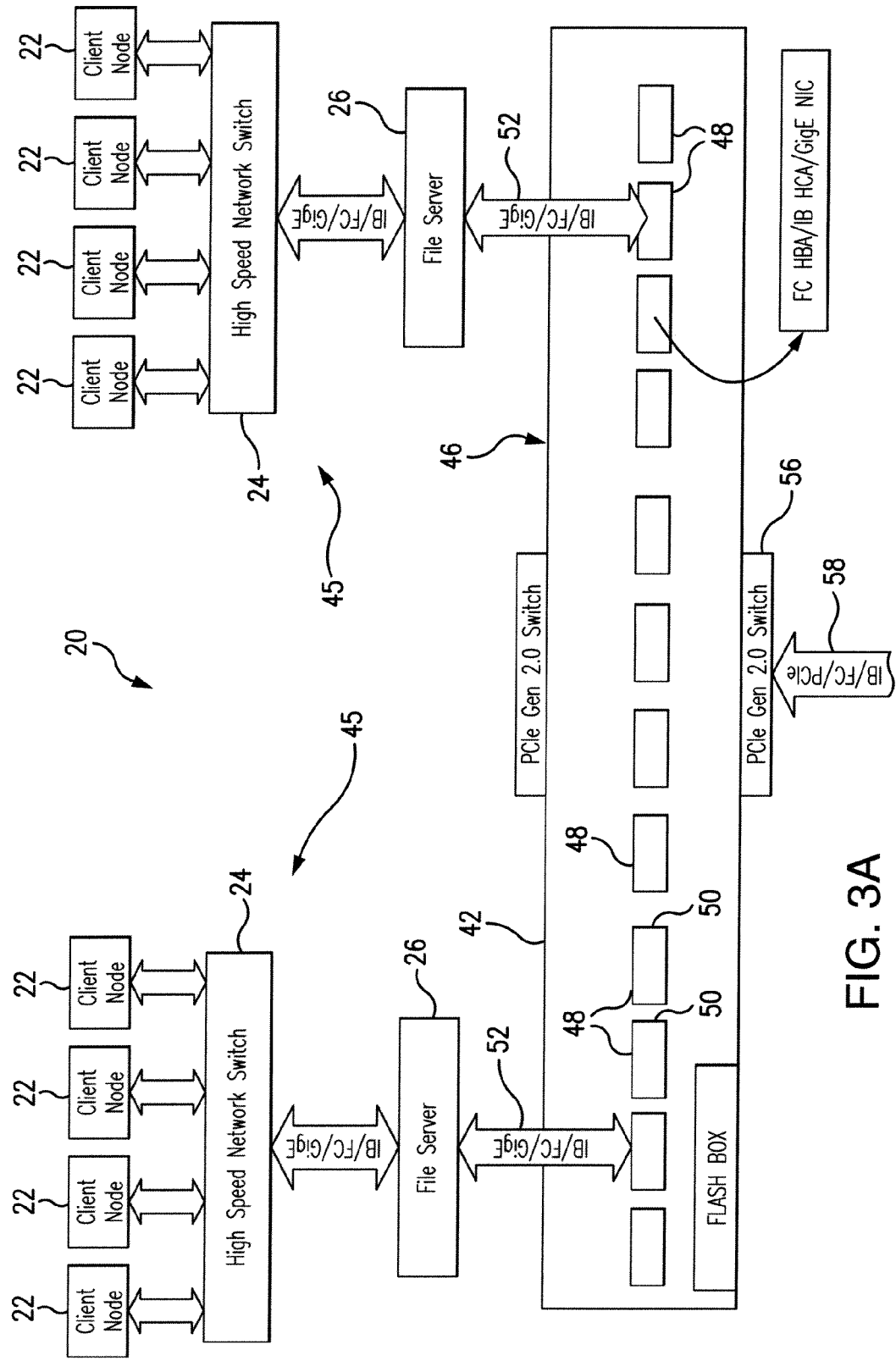
FIGS. 3A-3B represent schematically the subject system showing a modular structure of the intermediate data migration handling system.
Figure 3B:
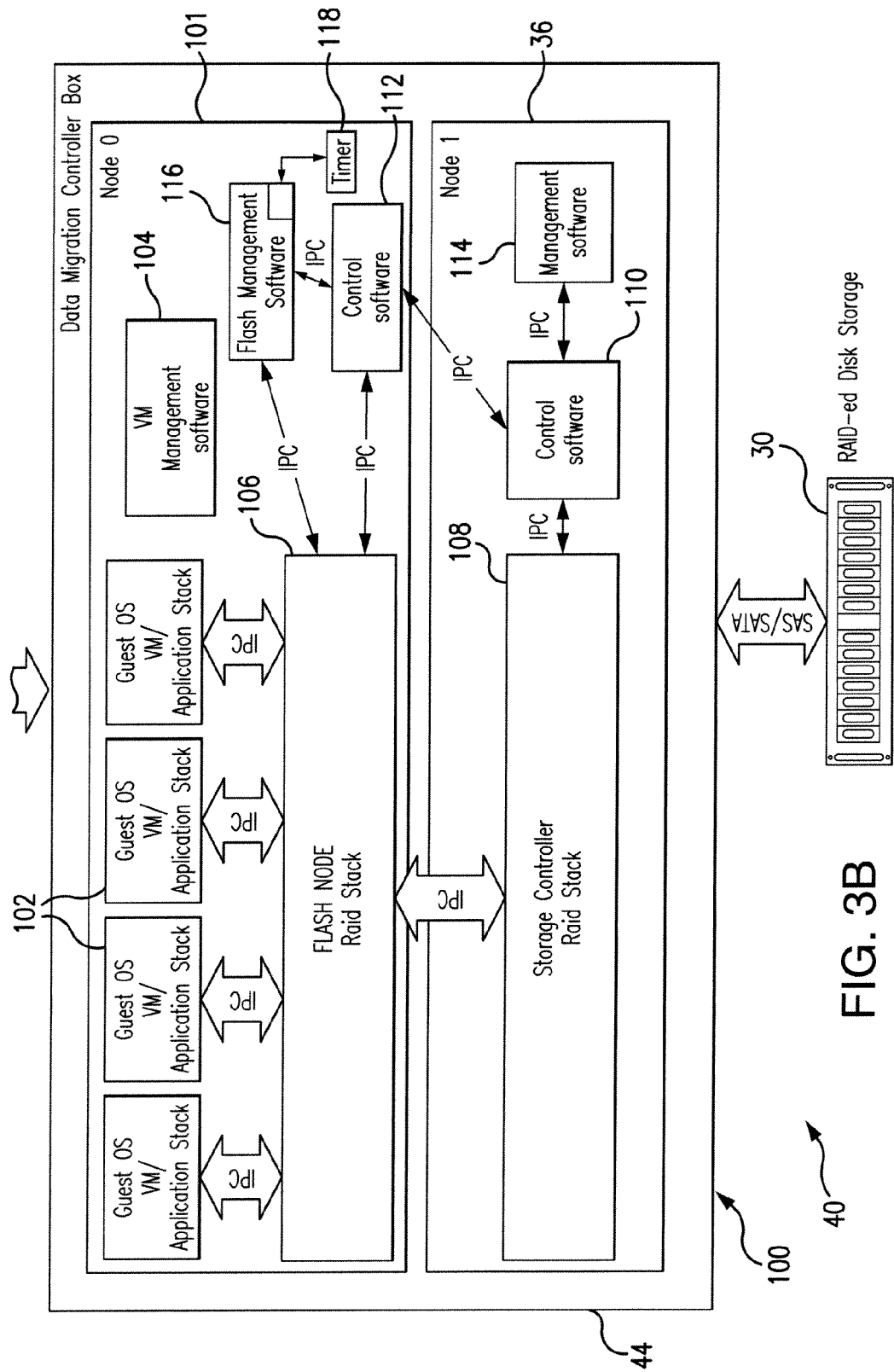

Referring to FIGS. 3A-3B, the intermediate data migration handling system 40 is configured as a modular structure. Specifically, the intermediate data storage module 42 is formed within a modular enclosure 46, referred to herein also as a flash box. The modular enclosure 46, as shown in FIGS. 3A-4 and 5A-1-5B-2, houses a number of data storage cards 48, further referred to herein as DDN (Data Direct Networks) cards. The DDN cards 48 are interconnected through a system of interfaces to the data generating entity 45 and to the storage controller(s) 36, as will be disclosed in detail in further paragraphs.

The modular enclosure 46 of the intermediate data storage module (flash node) 42 is formed with slots 50, schematically shown in FIG. 3A, for receiving the DDN cards 48. The number of DDN cards 48 in the modular enclosure 46 is determined by the system requirements, specifically, a number of data generating entities to be serviced or a size of requests to service.

As an example only, and not intended to limit the scope of protection of the present invention, twelve DDN cards are shown in FIGS. 3A and 5A-1-5B-1 which are housed in the modular enclosure 46. Also, a system enclosing eight DDN cards in the modular enclosure 46 is presented in FIG. 4. These embodiments are given as an example only, and any number of DDN cards may be enclosed in the modular enclosure 46.

The flash node 42 is essentially a redundant array of DDN cards, where each DDN card 48 has an I/O front end module 54 connected to the high speed network at the front end. Referring again to FIGS. 3A and 4, the modular enclosure 46 has a number of external connectors 52 (corresponding to a number of the DDN cards in the flash node 42) which render communication between the I/O modules 54 and the data generating entities 45 as required by the system. The hosts (data generating entities) 45 connect to the host ports of the flash node (intermediate data storage module) 42 using different data transfer protocols (IB, FC, GigE), as needed by the system. Although in this particular example of the system implementation, the module 54 is presented as the IB HCA (Host Channel Adaptor), the GigE NIC (Network Interface Controller), or FC (Fiber Channel) HBA (Host Bus Adaptor) may be used as well.

The flash node 42 also has a back end (or storage) interface which includes a storage I/O module 56 and a back end external connector 58, which both are adapted for interfacing with the data migration controller module 44 at the back end of the intermediate data storage module 42. The back end (or storage) interface may support any of the high speed protocols, including IB (Infiniband), FC (Fibre Channel), or PCIe (Peripheral Component Interconnect express). As an example only, and not intended to limit the scope of protection of the present invention to a single implementation, further discussion will relate to the data storage system which will connect to the target storage 30 over the PCIe interface.

Referring once again to FIG. 4, the IB module 54 internally connects to PCIe Gen 2.0 switch 60 over x8 PCIe bus 62. The switch 60 provided at the DDN storage card 48 has an end point 63 which connects to the Field-Programmable Gate Array (FPGA) 64 supporting all the Direct Memory Access (DMA) operations related to the Dynamic Random Access Memory (DRAM) 66, as well as RAID calculations in the system.

Another end point 68 of the switch 60 is connected to an FPGA 70 to control the movement of data to and from a flash card 72. The flash card 72 provided at each DDN card 48 is a Non-Volatile Random Access Memory (NVRAM) residing or on operatively attached to the file servers. The flash card 72 may be implemented using Multi-Level Cell (MLC) or Single-Level Cell (SLC) memory technologies. The choice of selecting the MLC or SLC based flash card, depends on the type of system objectives, such as for example, either achieving high performance at an attractive cost-per-bit ratio or achieving even higher performance over an intended period of time with a lesser cost sensitivity. Such devices have similar characteristic latency for either random or sequential activities. The amount of the non-volatile memory or the number of the flash cards within the DDN card 48 in the flash box 46 must be sufficient enough to store the data from at least one "checkpoint" of the computer node associated with the specific file server after performing a RAID operation. The DRAM 66 is shared between the external file servers and the flash cache (flash card 72) for data migration operations. The amount of the NVRAM 72 or the number of the DDN cards 48 housed in the flash node 42 is selected to be sufficient to support the storage of the data from at least one "checkpoint" associated with a specific server after the RAID calculations have been performed. The size of the DRAM 66 may be, for example, about 4 GB, while the size of the flash card 72 may be, for example, about 4TB.

The switch 60 also participates in external connection to the target storage. As presented in FIGS. 3A, 4 and 5A-1-5B-2, the switch 60 connects Flash card 72/FPGA 70, as well as the DRAM 66/FPGA 64 through the cable x8PCIe 74 to the external PCIe Gen 2.0 switch 76 (supporting the function of the back end interface 56) which supports the external connection of the flash node 42 to the data migration controller module 44.

Figure 4:
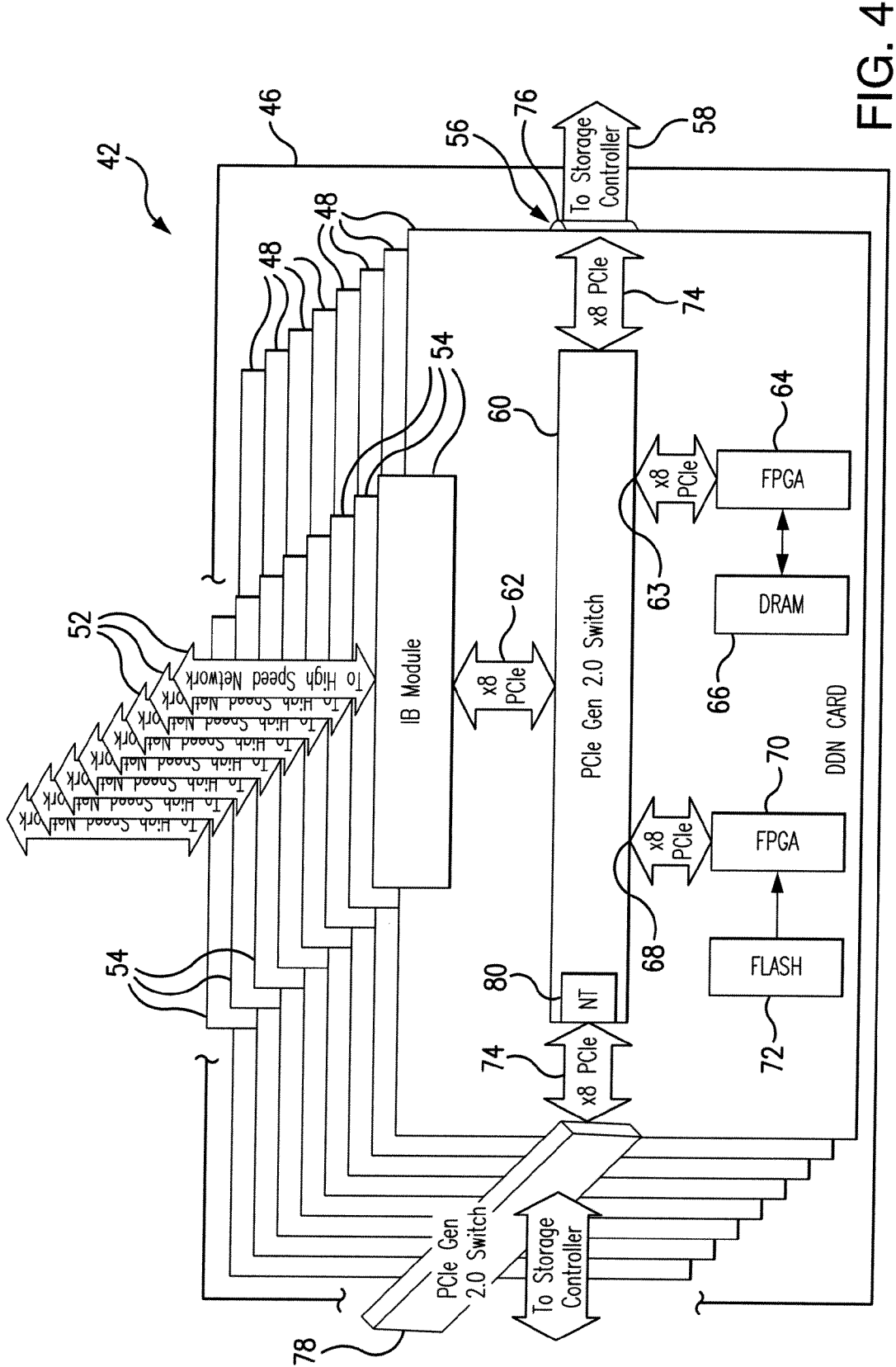
FIG. 4 is a schematic representation of the intermediate data storage module (flash node) and connections to external interfaces.

The present system is enhanced by providing an efficient mechanism for copying data between the primary and the backup (redundant) systems. As shown in FIG. 4, a second PCIe Gen 2.0 switch 78 is connected to the switch 60 through the Non-Transparent (NT) port 80 to serve as the failover path provided in the present system to transfer the intelligence to the backup system. The NT port 80 provides isolation required between primary and backup systems while allowing access to each other's addressed domain through translation registers.

As shown in FIGS. 5A-1-5A-2 and 5B-1-5B-2, a redundant data migration controller module 44' is provided to minimize the impact of hardware malfunction. In this arrangement, the switch 78 (shown in FIG. 4) serves as the connection between the flash node 42 and the redundant data migration controller module 44'. The external connection either to the primary data migration controller module 44 or to the redundant data migration controller module 44' is supported by the external x16PCIe Gen 2.0 switch 78.

Figure 1:
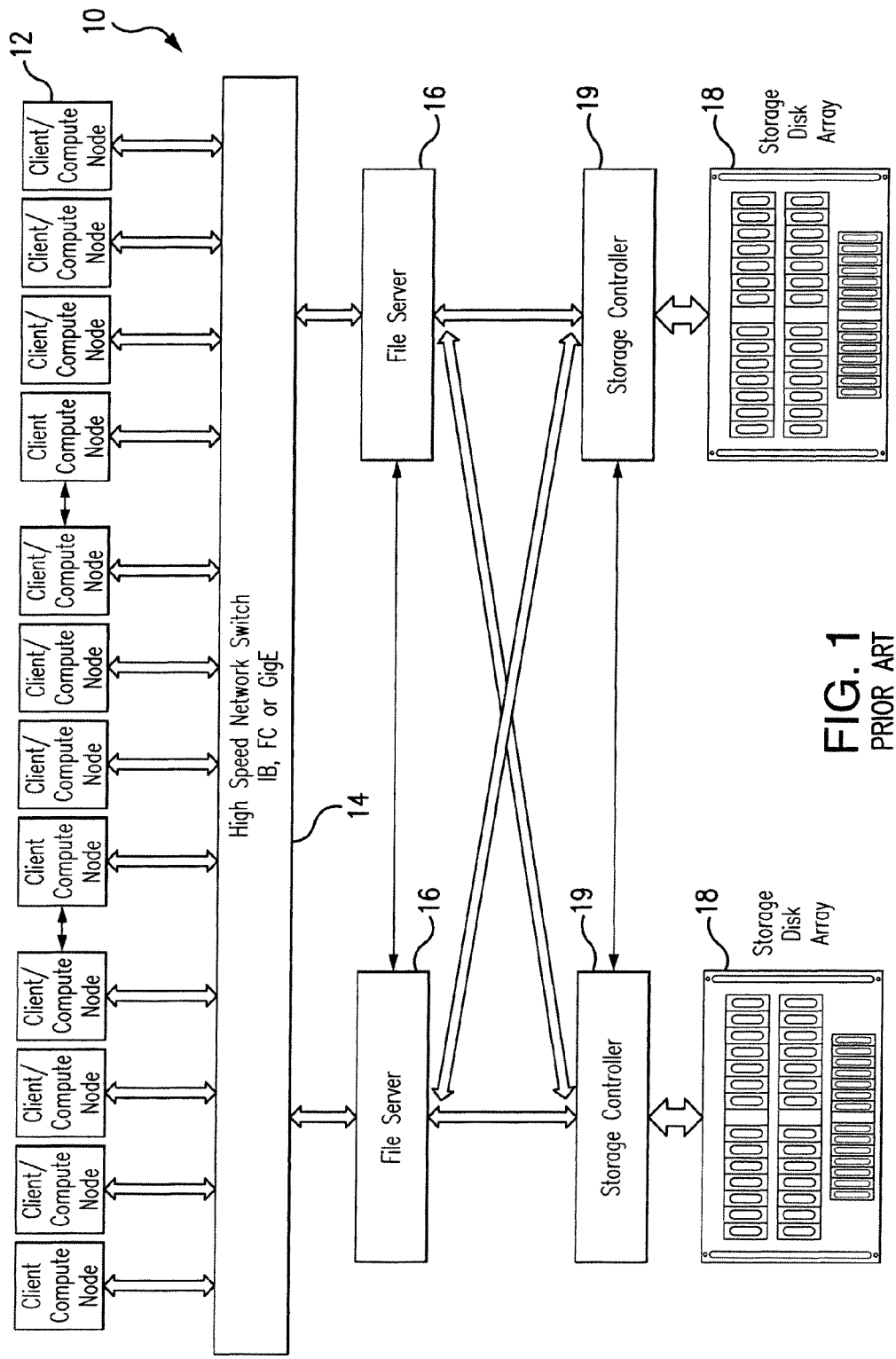
FIG. 1 is a schematic representation of a prior art data migrating system.
Figures 1, 5A:
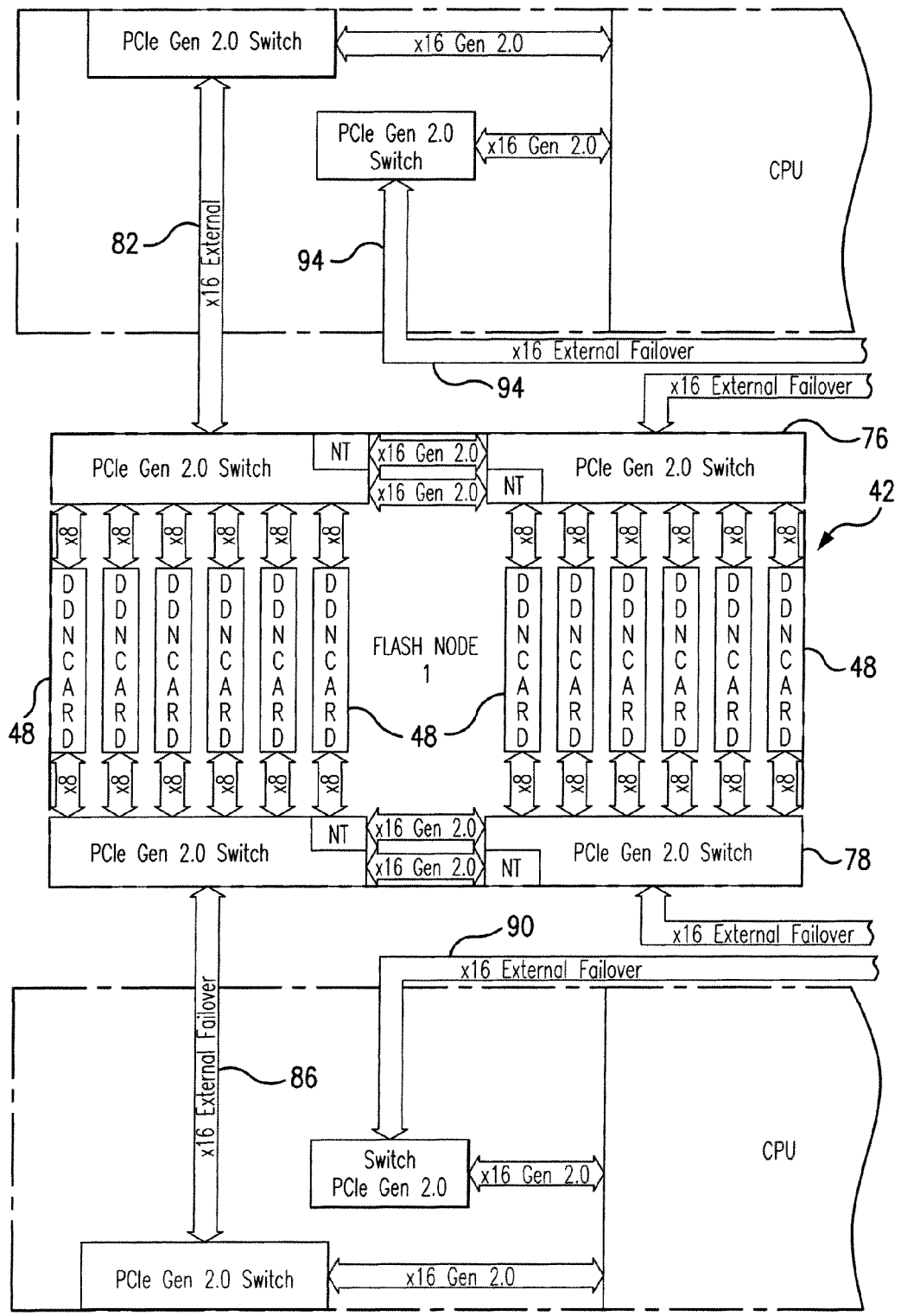
Figures 2, 5A:
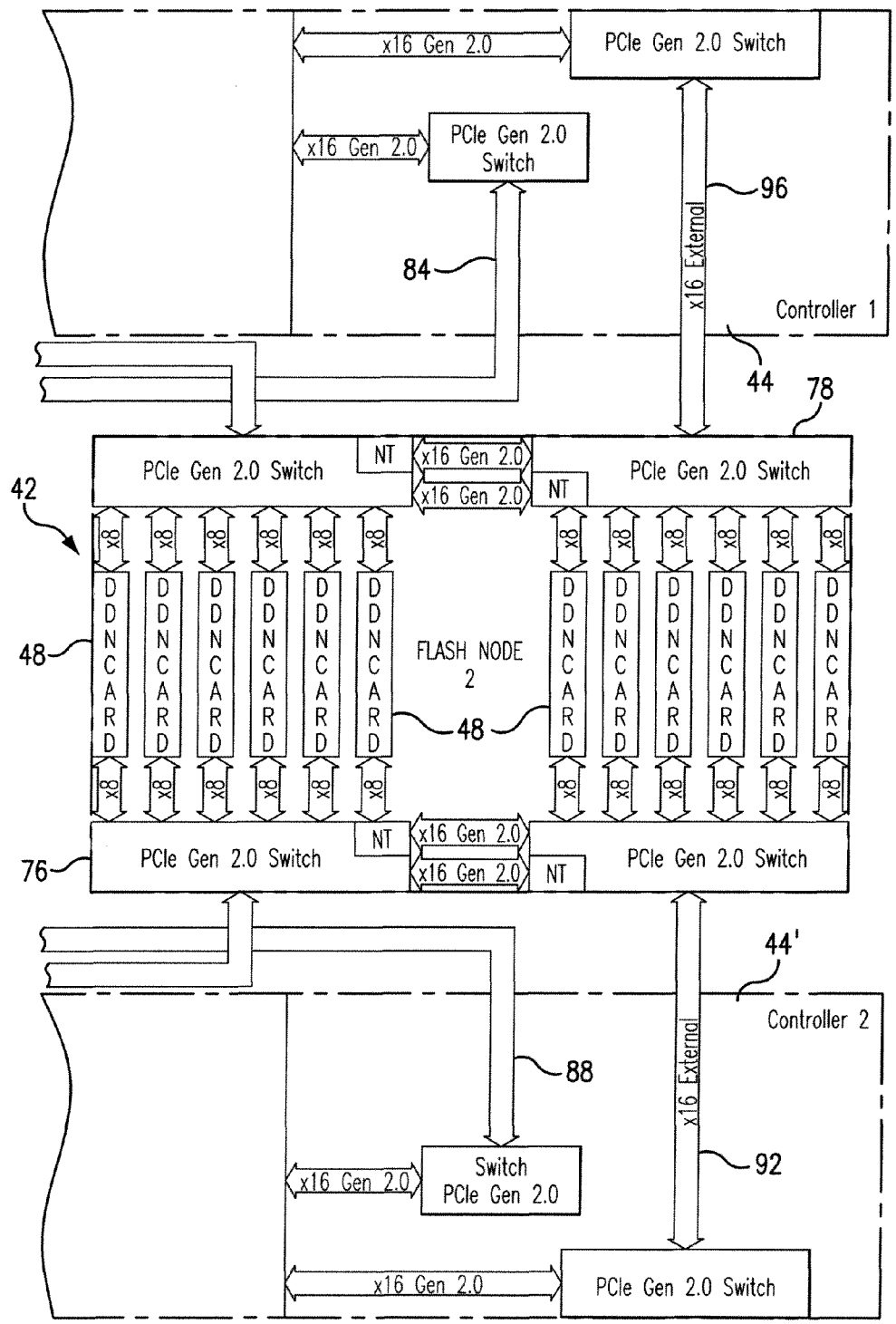

Referring to FIG. 5A-1-5A-2, there are two data migration controller modules 44 and 44' connected to two Flash Nodes 42, e.g. Flash Node 1 and Flash Node 2. Flash Node 1 is connected to the data migration controller module 44 through healthy paths 82 and 84. The Flash Node 1 is also coupled through the failover paths 86 and 88 to the redundant data migration controller module 44'. Flash Node 2 is connected to the redundant data migration controller module 44' via the healthy paths 90 and 92, while the failover connections between the Flash Node 2 to the data migration controller module 44 are through the failover paths 94 and 96.

The physical implementations for these data paths in the redundant arrangement may be implemented in any format including FC, IB or PCIe. Thus, for the Flash Node 1, the data migration controller module 44 serves as a primary controller, and the redundant data migration controller module 44' serves as a redundant controller. Alternatively, for the Flash Node 2 the redundant data migration controller module 44' is a primary controller, and the data migration controller module 44 serves as a redundant controller.

Different modifications of the controller redundancy are envisioned in the present system. For example, the redundant scheme may be implemented with two data migration controller modules 44, 44' for two flash nodes 42, as shown in FIGS. 5A-1-5A-2. This arrangement is considered to be the optimal to maximize bandwidths at the front end of the flash node 42.

Figures 1, 5B:
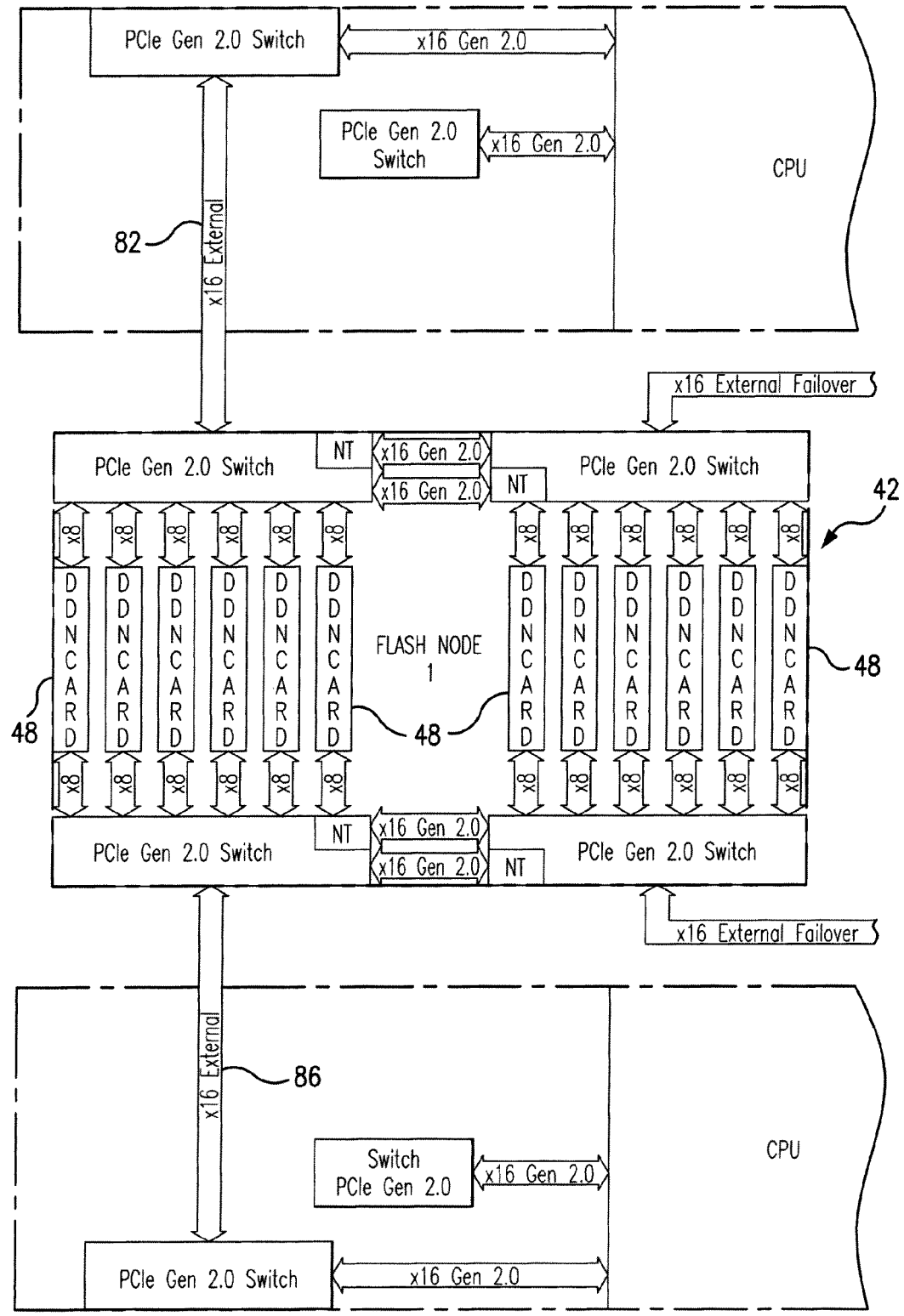
Figure 5B:
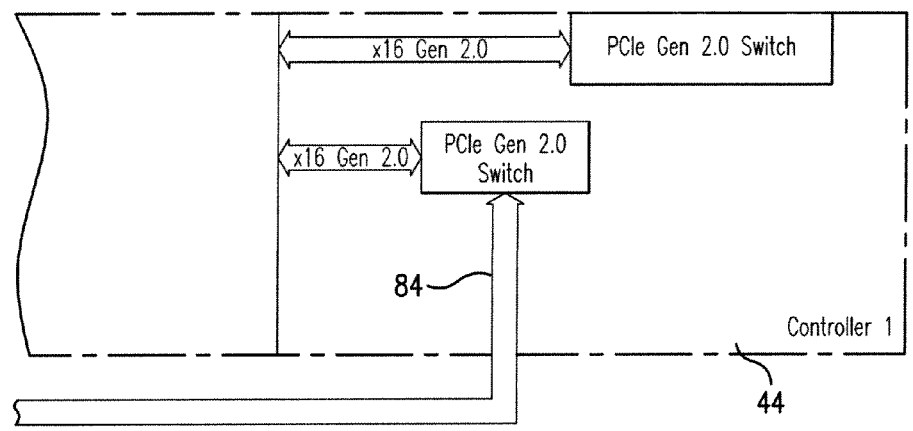
Figure 2:
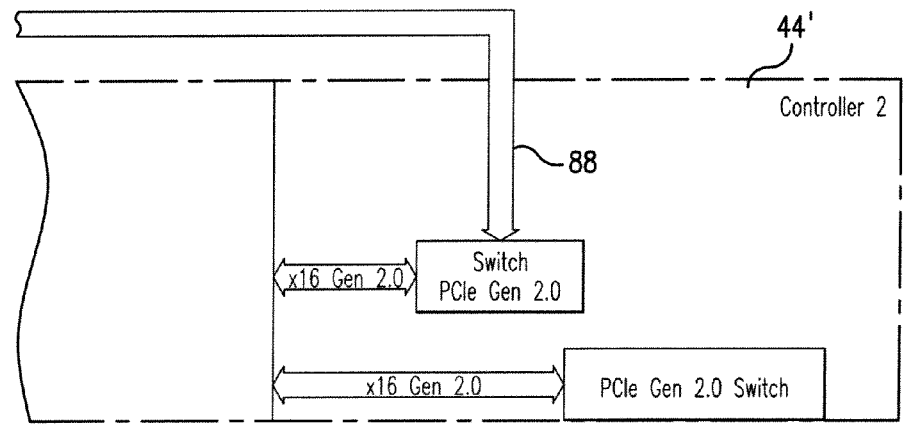

Alternately, two controllers 44, 44' for a single flash node 42 may be used, as presented in FIGS. 5B-1-5B-2. In this case, only one data transmission path remains active unless it fails, and only then the other path takes over the I/O activity from the flash node cache to the controller cache. Alternatively, a single controller 44 may be contemplated for each flash node 42.

Referring again to FIG. 3B, the system 20 of the present invention includes at least one data migration controller module 44, also referred to herein as a data migration controller box, which has a storage controller modular enclosure 100. The modular enclosure 100 contains two interconnected portions, e.g. Node 0 unit 101 and Node 1 unit.

The Node 0 unit 101 is responsible for the flash node 42 operation. For example, the Node 0 unit 101 determines the timing of I/O cycles, performs RAID calculations over the data prior to storing in the flash node 42, issues flush requests in the most optimal fashion, etc. The Node 0 unit 101 is a virtual machine containing software units running to interactively support the operation of the intermediate data storage module 42.

Node 0 unit 101 of the data migration controller module 44 includes Guest OS VM/Application stack units 102. The Guest OS is the operating system running on the virtual machine 101 using kernel based virtualization techniques which make use of Hyper calls or using Hypervisor depending upon the base operating systems. The Application Stack is the part of software stack running in the Node 0 unit 101 on which a number of host applications may run. The Application Stack unit interfaces through the HCAs, HBAs, and NICs to the high speed network 24 to receive the computational data from the data generating entity.

Virtual Machine (VM) Management software unit 104 is the software which establishes the connection to the Flash Node RAID Stack software 106, as well as to the Storage Controller RAID stack 108 and, in the pass-through mode of operation, directly to the control software 110 of the storage controller 36. The Virtual Machine Management software 104 also controls the presentation of Logical Units to the client nodes 22 as blocks devices. Software 104 controls the assignment of the PCIe slots to each user for their I/O activity and also provides other configuration information such as for example "the location of the guest operating system" which must be emulated. The software 104 also controls how many Guest Operating Systems may run with the available system memory.

The Flash Node RAID Stack unit 106 is a part of the Flash Node 0's software which deals with the data flow path as will be described in detail further herein. Briefly, the Flash Node RAID unit 106 supports RAID calculation and RAID protection scheme provided in the subject system 20.

The subject system provides RAID protection, e.g., capability to retrieve data from existing parts of data in case of the system's failure. The lost or corrupted data may be reconstructed using the redundant information residing in the flash cards 72 of the flash node 42, which may be either mirrored or may be reproduced by performing certain calculations using remaining data and parity information.

The virtualized RAID type in the system corresponds to the RAID type of the arrayed disks 30.

The RAID calculations are the operations of the RAID software performed in accordance with the configuration parameters, such as, for example, RAID type (RAID 5 or RAID 6) used in the system, RAID strip size, or data file size.

In RAID 5, data is written across all the drives along with the extra information, e.g. parity, such that the data may be retrieved if any one of the channels fails. With the RAID 5 level, both data and encoded data protection information are spread across all the drives in the array. Level 5 is designed to provide a high transfer rate (one-way transmission of data) and a moderate I/O rate (two-way transmission of data).

If the Flash Node RAID Stack 106 is configured in the manner of RAID 5 technology, it reads and writes parity information to the flash cards 72 corresponding to each module in the array. If a module fails, the system processor may reconstruct all user data from the user data and parity information residing on the flash cards 72 corresponding to the other modules. When a failed module is replaced, the system processor automatically rebuilds the array using the information stored on the remaining modules. The rebuilt array contains an exact replica of the information it would have contained if the original module had not failed.

In RAID 6, the data is written across all the drives along with the parity information in a manner that data may be recovered (or reconstructed) for up to two channels failure at a given time, which is attained by a double parity technique.

The control software unit 112 in the Node 0 unit 101, is a software responsible for setting up connections to the control software 110 in the Node 1, e.g., storage controller 36, by performing the required memory mapping for inter-process communication and DMA process.

The Node 1 in the data migration controller module 44 represents the storage controller 36 containing software units supporting the flow of data relative to the storage disk array 30.

In the Node 1, e.g., storage controller 36, the Controller RAID stack 108 supports the data flow path of the storage controller software 110. The storage control software unit 110 provides an interface between the RAID stack 108 and a management software block 114, and performs the RAID stack monitoring and specific functions required during various error conditions. The control software 110 also interfaces with the management software 114 and services its requests for the presentation information, statistics information, or establishing the system configuration.

The software units of the storage controller (Node 1) 36 are responsible for receiving the incoming data from the Node 0, e.g., data flushed from the flash node 42 or from hosts 22 (in the pass-through mode if permitted by the configuration), breaking incoming requests on the RAID stripe boundaries in the Storage Controller RAID Stack 108, allocation of cache nodes and buffers to store the data, RAID operations such as parity generation, and flushing the cache to the disks 28 in an optimum manner during the "write" requests as commanded by the flash management software unit 116.

During "read" requests (to "read" data from the disks 28), the storage controller 36 operates to break the requests on the stripe boundaries (the parameter of the RAID), and to allocate the cache nodes and buffers, wherein buffers are allocated for RAID operations which could be "read-modified-write" operations, as well as to send a request to the disks for reading the data. Responsive thereto, the data from the disks is transferred to cache in the Storage Controller RAID Stack 108, parity check operations are performed (if the system is configured for this purpose), and the data transfer from the cache 108 to the requesting host takes place (in the "pass-through" mode) or to the intermediate flash node 42, subject to the system configuration.

In addition to above-presented software units of the Node 0 unit 101, it is an important core feature of the intermediate data migration handling system 40, that a flash node data storage management software, referred to herein as flash management software 116, runs on the data controller module 44. In its entirety, the management software 116 underlies the operation of the system 20 by supporting the migration of data from the computer/client nodes 22 and/or file servers 26 over the separate network 40 formed by the intermediate data storage system (e.g., flash node) 42, in conjunction with the data controller module 44, which includes the storage controller 36.

Flash Management Software unit 116 is coupled to the storage controller control software 110 and controls the flushing of the flash node 42 data periodically to the disk storage 30 by generating the most efficient write request for the storage controller architecture.

The Flash Management Software 116 is coupled to the storage controller's management software 114 and therefore is capable of determining the most efficient "write" requests for the target storage architecture 30. The Flash Management Software 116 uses the I/O metadata information for the data in the flash cache, and based on certain criteria, such as high flush priority, minimization of the disk seek time and/or tier usage, generates largely sequential I/O "write" requests to the target storage controller 36 favored by the disk drives 28.

If the "checkpoint" cycle is for example 10%, then the remainder of the overall time may be used for the disk operation which greatly reduces the number of spinning disks required by a high performance simulation environment 22. Power and cooling which are of concern in large cluster environments are positively addressed in the present system by greatly reducing the infrastructure required for storage attached to clusters.

The Flash Node Management Software 116 runs on the data controller module's 44, as shown in FIGS. 3A-3B, and manages the operation of the flash node 42. The Flash Management Software 116 affects the movement of data from the non-volatile memory of the flash cards 72 to a large pool of disk drives 28 operated by the storage controller 36. The operations include moving of the I/O cycle data from the DRAM 66 of each DDN card 48 to the flash card 72 after performing RAID calculations on the data received from the data generating entity, moving that data from the flash cards 72 to the target storage 30 during flush operations, performing data integrity checks referred to as "Datasure" during "reads" of data from the flash node 42, either before flushing to target storage or before completing the "READ" request from the computer (or client) node 22.

Upon receiving a "write" request from the host (either computer node or a client node, as well as file server), the operation of the intermediate data migration handling system 40 involves receiving the host request, validating the request, checking the flash cache lookup table for the matching requests, creation of metadata entry for flash cache 72, and computation of the number of flash arrayed RAID stripes required to hold the entire request. Further, the RAID engine allocates the space for data and parity in the DRAM 66 in the DDN Cards 48 of the intermediate data storage module 42, followed by writing of RAID data and parity information to the flash card 72. The incoming host data is striped across the flash cards 72 in the flash node 42. Further, a statement is sent to the host that the data is received by the flash node 42. After predetermined conditions are met such as, for example, after the elapse of a predetermined time since the last I/O cycle or expiration of a configured flush timer, the data is flushed to the storage controller 36. This process will be described in detail further herein with regard to FIGS. 6A-12.

Upon receiving "read" requests from hosts (computer/client nodes, or servers), the requests are broken on the stripe boundaries and are checked if the requested data is in the flash node 42 or is absent therefrom. The request is further serviced by transferring the data to the host from the flash cache, if the requested data are contained therein. Otherwise, the request is forwarded to the target disk storage. This process will be further described in detail in conjunction with FIG. 13.

The flash management system 116 maintains a software timer 118 which determines when the last I/O cycle was concluded for the computer node 22 and when the computer node returned to its compute state. When a predetermined sufficient time has elapsed from the last I/O cycle of the compute node, the data from the flash node 42 is flushed to the target storage system 30. Flash Management Software 116 schedules the flushing of the data to storage controller 36 if it is determined that the flash node 42 has reached a pre-configured threshold of fullness. In this arrangement, the writing of computer nodes data from the flash node 42 to the target storage 30 is performed independently of the I/O cycle of the computer node.

The flash node 42 acts as a large buffer which operates to increase the bandwidth during ingesting of data from a number of different file servers or computer (client) nodes during the I/O cycle, which would otherwise require availability of several target storage controllers and a large number of disk drives to support the ingest rate. Thus, the usage of the flash nodes 42 as the intermediate data storage layer, not only provides an increased bandwidth but also results in reduced operational costs of the system.

The system attains an improved duty cycle of the computer nodes, increased effective bandwidth of the disk drives, reduced operational costs of the system and minimized power consumption during the data migration between the computer nodes and the disk drives by using the intermediate data storage system (flash node) 42 along with the data storage management system (data migration controller module) 44 operatively coupled between the file servers and the disk drives. The Flash Management Software in the data migration controller module appoints a disk drive and determines an optimal sequence of data transfer from the flash node to the designated disk drive and schedules the data transfer in an optimal sequence.

The flash node (or cache) 42 maintains metadata information to aid in requests sorting for flushing. The flash node receives the "raw" data from the computer nodes. The flash cache uses the internal flash cache descriptors for tracking the metadata information about the data received from the computer nodes. The metadata information is used by the flash node 42 to sort I/O requests to the back end in the order which minimizes the access time to the disk drives.

The storage controller 36 works in conjunction with the flash node 42 to improve bandwidths and reduce latency and power consumption. The Flash Management Software 116 determines when the compute node "write" cycle has finished and determines when the compute node is likely to begin its next I/O write cycle. In between, the Flash Management Software issues a "flush" request to the storage controller to fetch the data and store it on the disks. The storage controller receives the "write" requests from the Flash Management Software 116 which are sorted and ordered for the optimal data transfer sequence for the target disk(s).

The present system, in addition to being capable of serving as an intermediate buffer, also is configured to maintain the data reliability by performing RAID calculations over the "checkpoint" data in the DRAM 66 before storing the data D and generated parity P values in the flash cache. The flash node system may be configured with either RAID D+P (RAID 5) or RAID D+P1+P2 (RAID 6) depending upon the failure tolerance level configured for the system.

Figure 6A:
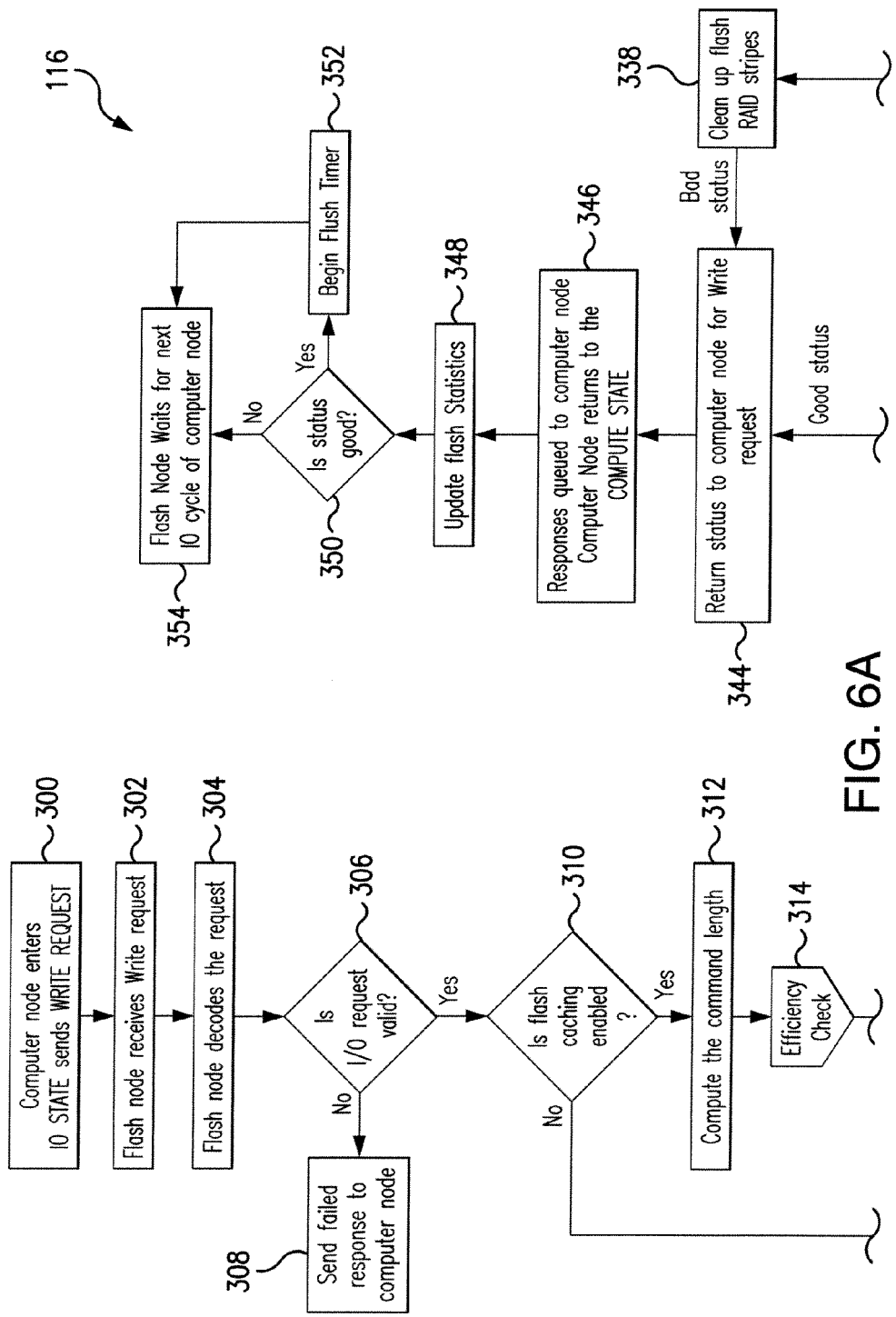
FIGS. 6A-6B represent a flow-chart diagram of the operation for servicing "write" requests from data generating entity.
Figure 6B:
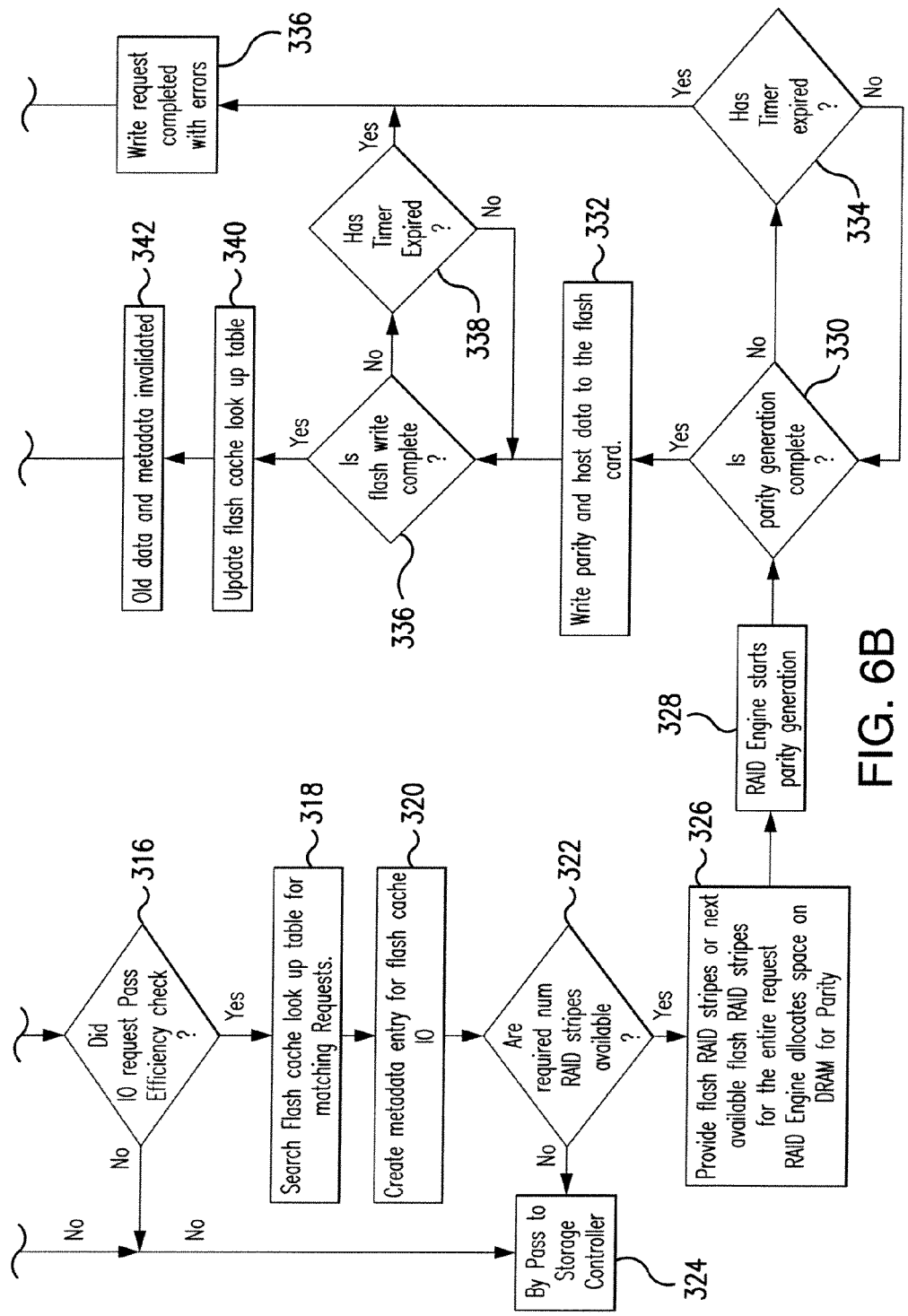

Referring to FIGS. 6A-6B, which illustrates the data migration from the computer (client) node 22 to the flash node 42, upon receiving the "write" requests from the node 22, RAID calculations being performed before storing the host data in the flash cache 42. When the computer node 22 is in compute state, the flash node 42 (and the storage controller 36 if the "pass-through" mode is enabled) is waiting for servicing any new incoming I/O requests from the computer node or the client. It is assumed that all "flush" operations to the target storage 30 from the flash node 42 have concluded and the compute node is in the compute state.

After a predetermined time, a computer node enters the I/O cycle in block 300 and sends "write" requests. The flash node 42 receives the "write" request (block 302), and the request is decoded in block 304 "Flash Node Decodes the Request". In the logical unit 306 "Is I/O Request Valid?", the validity check is performed. If the I/O request is not valid, a failed response is sent back to the computer node in block 306 "Send Failed Response to Computer Node".

If, however, the I/O request is found to be valid, the logic moves to the logical block 310 "Is Flash Caching Enabled?" to verify whether the flash caching is enabled. If the flash caching is enabled, then the I/O request is received by the flash node, and the I/O request length is determined in the logic block 312 "Compute Command Length". Upon the I/O request length being determined, the logic flows to the decision block 314 "Efficiency Check" where efficiency decisions are made.

Figure 7:
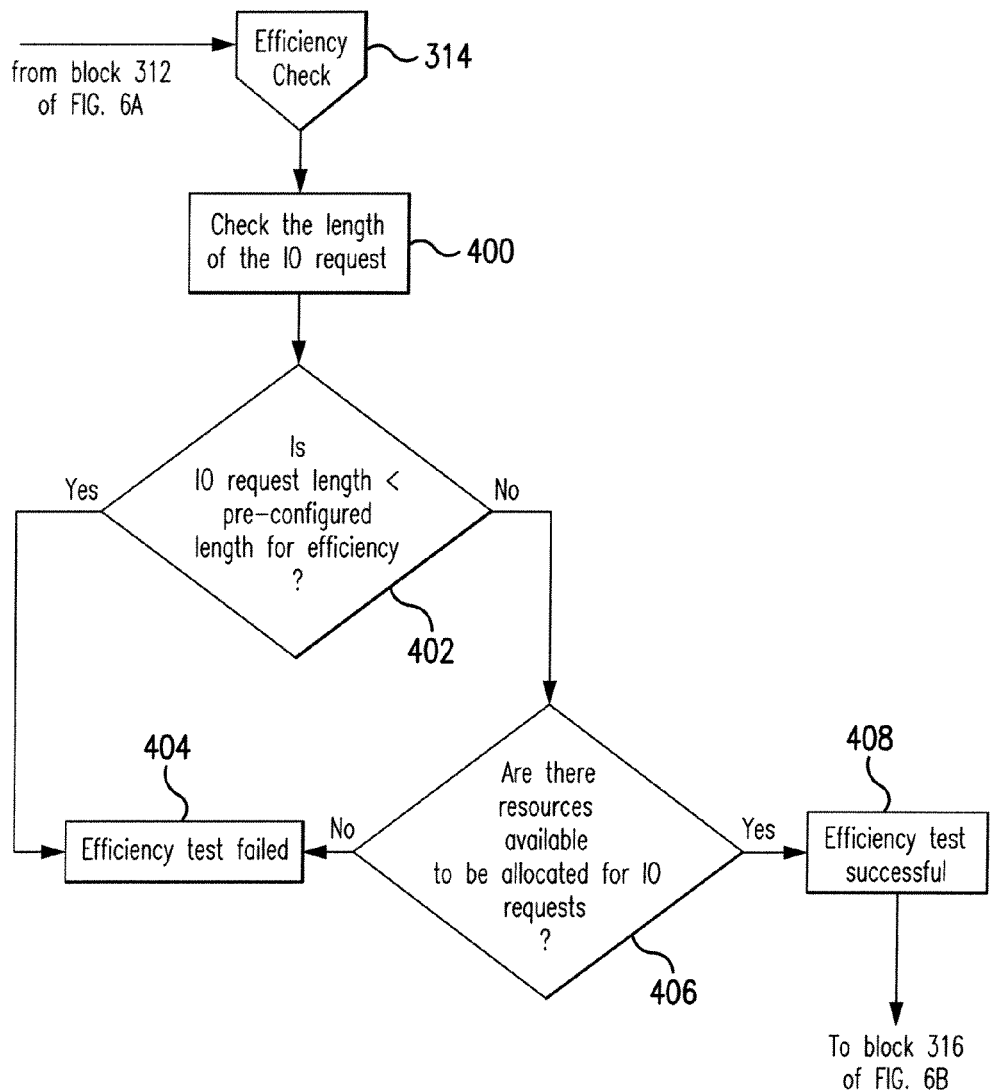
FIG. 7 is a flow-chart diagram of the "efficiency check" routine for "write" requests.

The details of the efficiency check routine for write requests are presented in FIG. 7. The efficiency decisions take into consideration whether the available resources are sufficient to handle the "write" requests in the most efficient way by the flash node or should be sent directly to the target disk drive. The efficiency decisions also take into account if there are enough resources available to handle the write request. The efficiency check routine is initiated in block 400 "Check the Length of the I/O Request" and, upon computing the length of the I/O request, the logic flows to the logical block 402 "Is I/O Request Length Smaller Pre-configured Length for Efficiency?", where the calculated I/O request is compared to the available resources. If, in block 402, the I/O request length is smaller than the pre-configured length for efficiency, the logic moves to block 404 "Efficiency Test Failed".

If, however, in block 402 it is determined that the I/O request length is larger than the pre-configured length for efficiency, the logic follows to block 406 "Are There Resources Available to be Allocated for I/O Request?". If there are no resources available for servicing the I/O request, the logic flows to the block 404 "Efficiency Test Failed". If, however, in block 406, it is decided that there are resources available for servicing the I/O request, the logic follows to block 408 "Efficiency Test Successful", and the flow may return to the block 316 of FIG. 6B "Did I/O Request Pass Efficiency Check?".

If the flash node 42 does not have sufficient resources, or if the flash node has reached the threshold for the predetermined fullness, the valid "write" request is sent directly to the target disk storage system using the "pass-through" mode from block 316 to the block 324 "Bypass to Storage Controller".

If in block 316, the "write" request passes the efficiency check and it is decided that the flash node will service this request, the flash cache lookup table is searched for matching requests in block 318 "Search Flash Cache Lookup Table for Matching Requests". Further, in block 320, a new metadata entry is created in the flash cache lookup table.

From block 320, the logic flows to logical block 322 "Are Required Number of RAID Stripes Available?", where the number of RAID stripes required to accommodate the entire I/O request is determined. If the flash node is unable to allocate required number of RAID stripes to accommodate the entire I/O request, the I/O request is sent directly to the storage controller using the pass-through mode in block 324.

If however, the RAID stripe allocation is successful for the host data in DRAM, the logic passes to block 326 where the RAID engine allocates a space for generated parity values for the host data on the DRAM in block 328 "RAID Engine Starts Parity Generation".

When a successful parity generating operation is determined in block 330 "Is Parity Generation Complete?", the logic moves to block 332 "Write Parity and Host Data to the Flash Card" where the flash node data management software initiates the "flash write" operations by moving the host data D and the parity values P as "full stripe" to pre-allocated buffers on each flash card 72 in the flash node 42.

If, however, a "parity generation" operation or a "flash write" operation in block 330 is not completed within the specified time (as decided by the timer software) in block 334 "Has Timer Expired?", a "Write Completed with Errors" status is sent to the compute node (block 336) indicating that the "write" operation to the flash node is failed.

Timers are used to keep track of time used in parity generation operations and during "flash write" request operations. In block 336 "Is Flash Write Complete?", if the timer has expired in block 338, the logic flows to block 336 identifying that the "write" request was completed with errors. If, however, in block 336 the "flash write" procedure is completed, the logic flows to block 340 "Update Flash Cache Lookup Table". When the "write completed with error" status is received in block 336, the compute node may then reschedule the write request for that I/O. The RAID stripes are de-allocated and the metadata entries are updated in block 338 and the "bad" status signal is sent to block 344 "Return Status to Computer Node for Write Request".

It however, both, the "parity generation" and the "flash write" operation. are a success, the logic flows from block 336 to block 340 to update flash cache look-up table, and further to block 342 to invalidate old data and metadata, if any. Further, a "good" status indicating successful operation is sent to the host. Upon receiving a "bad" status of unsuccessful servicing the "write" request from block 338 or successful status from block 342, the system returns the status to the computer node in block 344 for a next "write" request.

Once all the "write" requests from the computer node are concluded, the computer node returns to the compute state in block 346, while its I/O cycle data waits within the flash node for a predetermined time before being flushed to the target storage. The flash statistics are updated in block 348 with the "good" status signal being provided to block 350 "Is Status Good?". If the status is good, the flash timer is started in block 352 to keep track of time elapsed since the last I/O cycle of the compute node was concluded. The "Flash Timer" information determined in block 352, is used to schedule the "flush" or "write" requests to the storage controller.

If however, in block 350, the status is determined to be bad, meaning that the request was not serviced, the logic flows to the block 354 "Flash Node Waits for Next I/O Cycle of Computer Node".

Figure 8B:
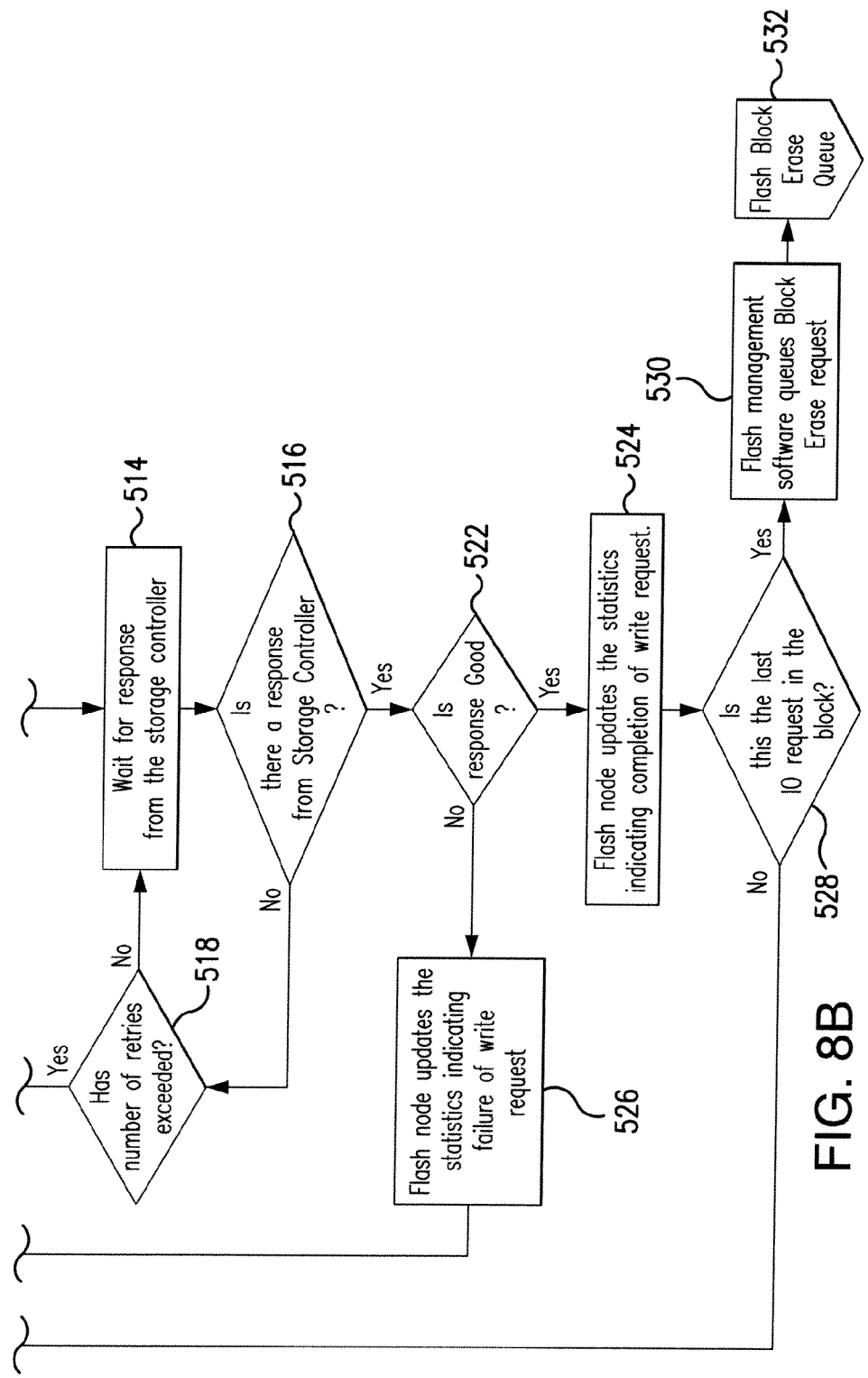

FIGS. 8A-8B demonstrate the routine of flushing the flash node data to the target storage controller. When in block 354 of FIG. 6A, the flash node waits for a new I/O request (corresponding also to block 500 of FIG. 8A), the flash node management software follows to the decision block 502 "Has Enough Time Elapsed Since Last I/O from Compute Node?" where the software determines whether the pre-configured time has elapsed since the last I/O cycle of the computer nodes, e.g. the flash timer has expired. If the flash timer has expired the logic flows to block 504 "Build Most Efficient Command".

If, however, in block 502 it is determined that the pre-configured time has not elapsed since the last I/O cycle, the logic flows to the decision block 506 "Is Flash Storage Threshold Reached?". If the predetermined threshold of fullness for the flash node has not been reached, the logic returns to block 500 where the flash node remains in a waiting regime for a new I/O request. If, however, in block 506 it is determined that the predetermined threshold of fullness of the flash node has been reached, the logic moves to block 504 to build the most efficient "write" request for the target controller based upon the target storage architecture.

Figure 9A:
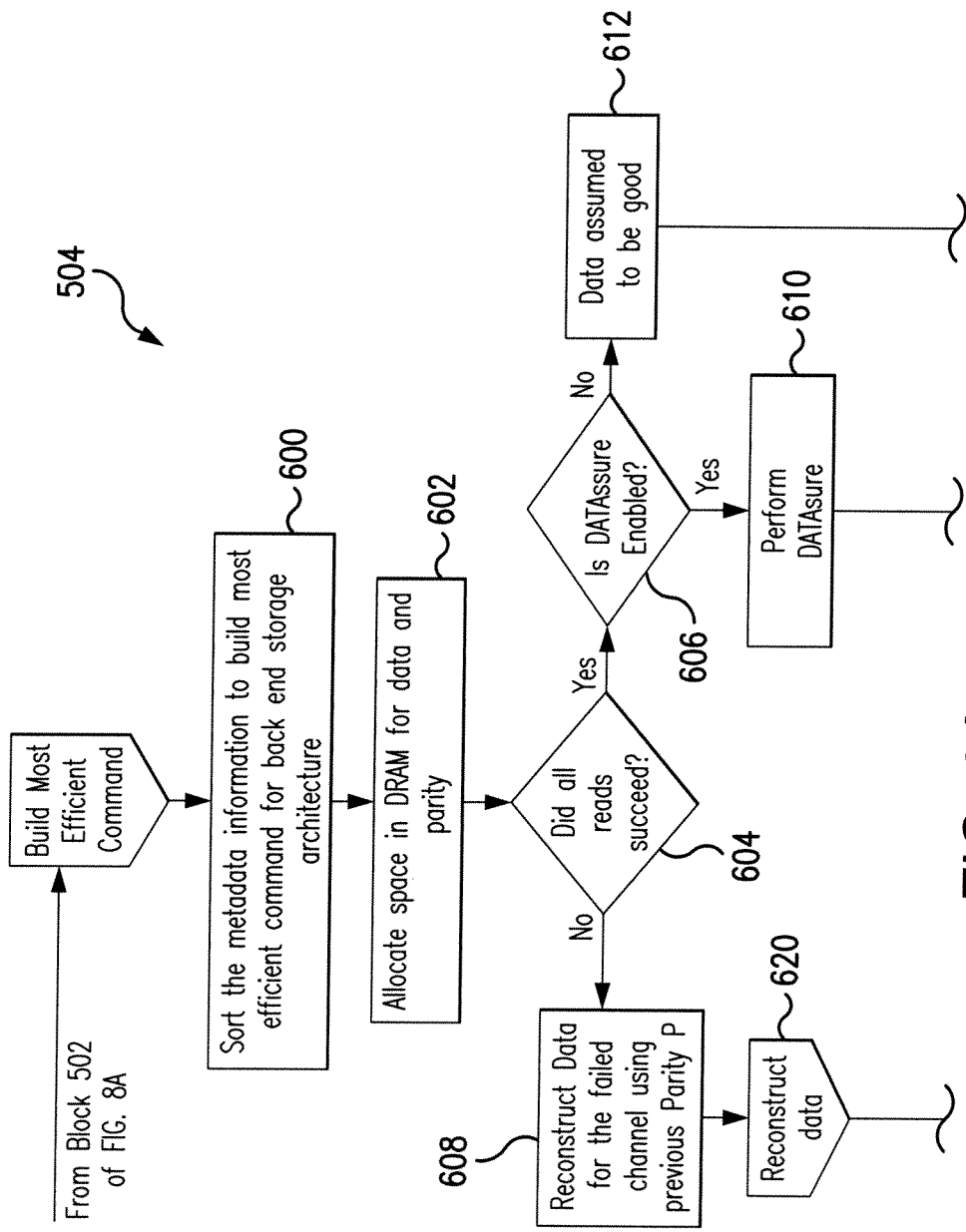
FIGS. 9A-9B represent a flow-chart diagram of a process of "efficient command building" for the "write" operation to a target storage disk(s)
Figure 9B:
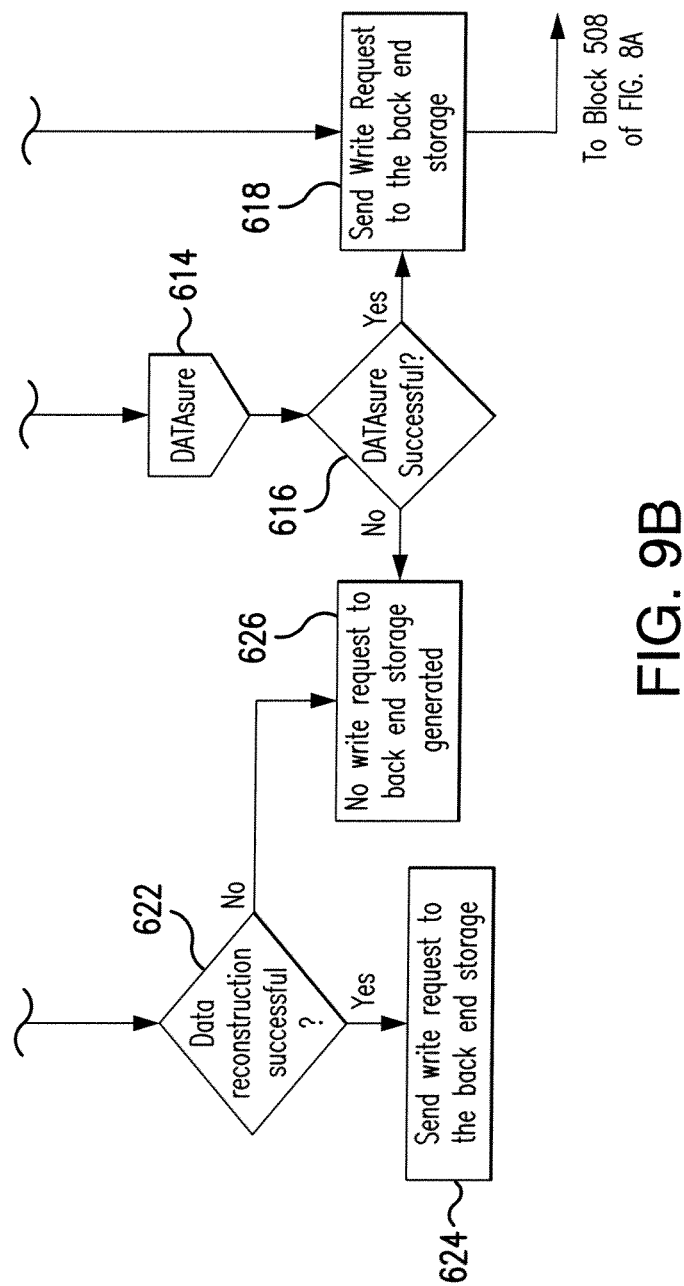

FIGS. 9A-9B show the efficient command building routine (block 504 of FIG. 8A) which starts in block 600 "Sort the Metadata Information to Build Most Efficient Command for Back End Storage Architecture" where the metadata information describing the data stored within the flash node is used to build up most efficient "write request" to the target storage, based on the flash priority, entire usage minimization, disk seek time minimization, and the generation of the most optimal sequential I/O. From the block 600, the logic follows to block 602 "Allocate Space in DRAM for Data and Parity" where the flash management software allocates the space in DRAM of the flash node for reading data D and parity values P from the buffers on the flash cards composing the RAID stripe. From block 602, the logic moves to the decision block 604 "Did All Read Succeed?". Once the "reads" are successful, the logic flows to the decision block 606 "Is Datasure Enabled?".

If the Datasure routine is enabled on the flash node, the logic performs the Datasure routine in block 610 by performing data verification for integrity checks in block 614 on data read into the DRAM of the flash node. The logic flows from block 614 to the decision block 616 to determine if the Datasure is successful. If the Datasure is successful, the logic flows to block 618 to generate the "write" request to the storage controller.

If however, it is determined in block 616 that the Datasure fails, the data within the flash node are marked as no longer available to the user following which logic flows to block 626 "No Write Request to Back End Storage Generated".

If in block 606, the Datasure process is not enabled, the logic flows to block 612 where it is determined that the data is assumed to be "good" and the process ends in block 618 to generate the "write" request to the storage controller.

Figure 10:
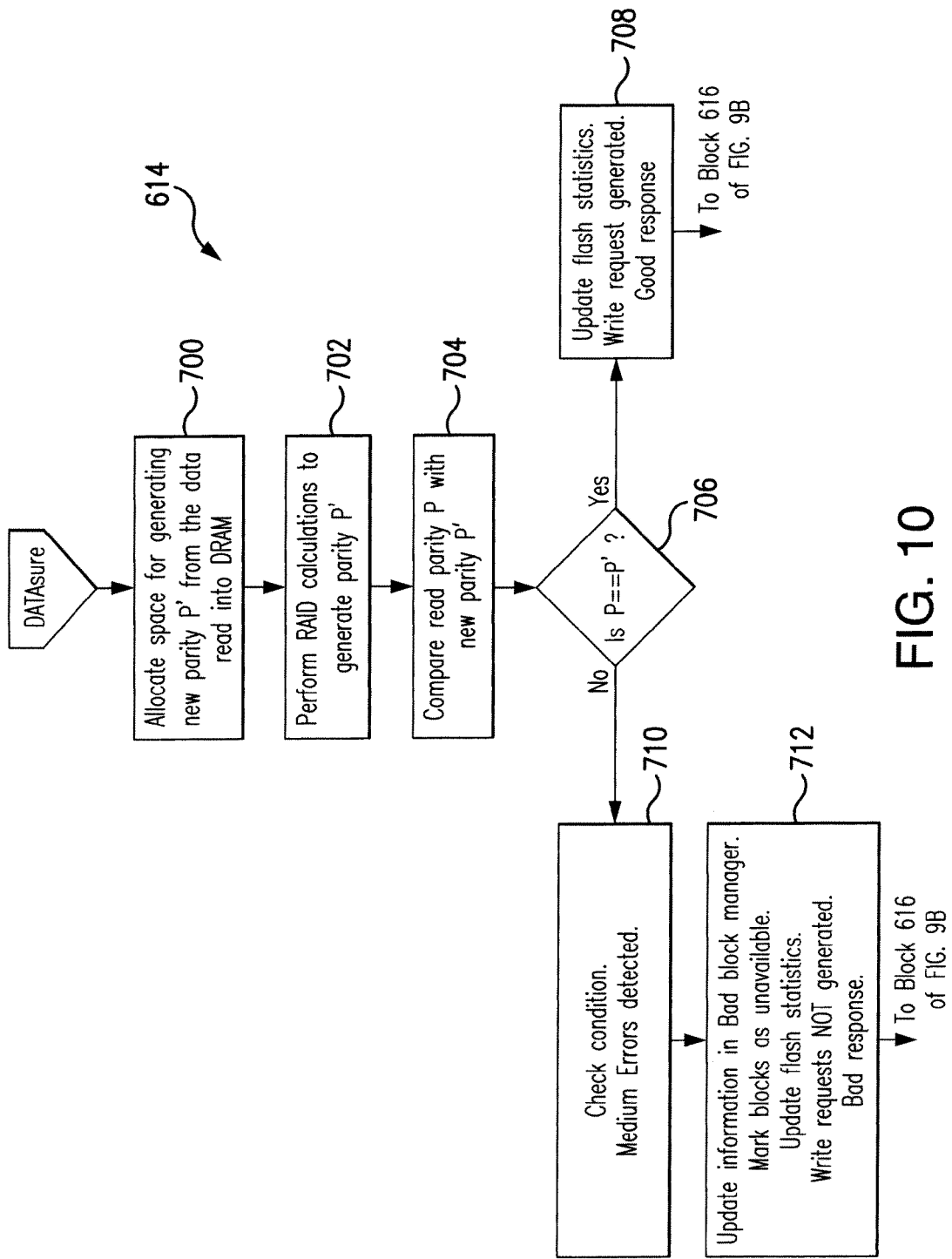
FIG. 10 is a flow-chart diagram of a "DATAsure" routine for a "READ" request issued by a data generating entity.

The Datasure process of block 614 is described in detail in FIG. 10 where the Datasure routine starts in block 700 in which allocation of an additional space in DRAM for new parity value P' is performed. The logic further follows to block 702 "Perform RAID Calculations to Generate Parity P'" where the RAID calculations are performed on data D in the DRAM and new parity P' is generated. In block 704, the new parity P' is compared with the old parity value P and the logic flows to block 706 "Is P Equal P'?".

If in block 706 it is determined that P and P' are not the same, the logic flows to block 710 to check the condition and to detect the medium errors indicating that the medium is no longer accessible.

The flash node management software contains a "bad" block manager routine which remembers the "bad" blocks and marks them as unavailable in block 712. The flash node management software also sends the response from the Datasure process to block 616 of FIG. 9B following which no write requests are generated to the storage controller in block 626 of FIG. 9B.

If, however, in block 706 it is decided that P=P', the Datasure successful operation signal is sent to block 616 of FIG. 9B responsive to which the logic flows to block 708 of FIG. 10 (or block 618 of FIG. 9B) to generate a "write" request, update flash statistics and send a "good" response to block 616 of FIG. 9B.

Returning to FIG. 9A, if in block 604 it is determined that all "reads" do not succeed, then "data reconstruction" may be performed in block 608 "Reconstruct Data for the Failed Channel Using Previous Parity P" if possible. In block 620, the data reconstruction process uses redundant information from the RAID stripe metadata to reconstruct the lost (or corrupted) pieces of information. Depending upon the system configuration for predetermined failure tolerance rate, that is whether RAID D+P (RAID 5) or RAID D+P1+P2 (RAID 6) is used, that data may be reconstructed for single or double component failures.

Two types of host command request descriptors are maintained in the system: one that describes the nature of the request received from the host, and another being an address of where that information is saved in the flash cache. This information is maintained by the Flash Node RAID software 106.

For the lost data reconstruction, the data saved in the flash cards 72, is read into the DRAM 66 of the card 48. The DRAM 66 is shared between hosts and flash cards to receive the hosts requests. It has memory which is allocated to accommodate RAID stripes and the parity calculated over the data blocks before the data is written onto the flash cards 72 at the specific addresses.

If the information is lost on one of the data flash cards 72, certain logical operations are performed using parity and remaining healthy data to reconstruct the data. If only the parity information is lost, then the actual data stays unharmed and no reconstruction is needed.

Along with the host data during the "read" requests, some additional information is written and maintained to determine where that particular information is saved in the flash box. A flash cache search tree is maintained by the flash node RAID software which is used to look up the command entry in the existing list. This information includes the identification of the DDN card which received the host request, the identification of the flash cards which carry that information, as well as the starting address and size of the request, etc.

Using this information, the data is "read" into the DRAM 66 of the DDN card 48 (where the information was initially received) and is transferred back to the host which made the READ request.

Figure 11:
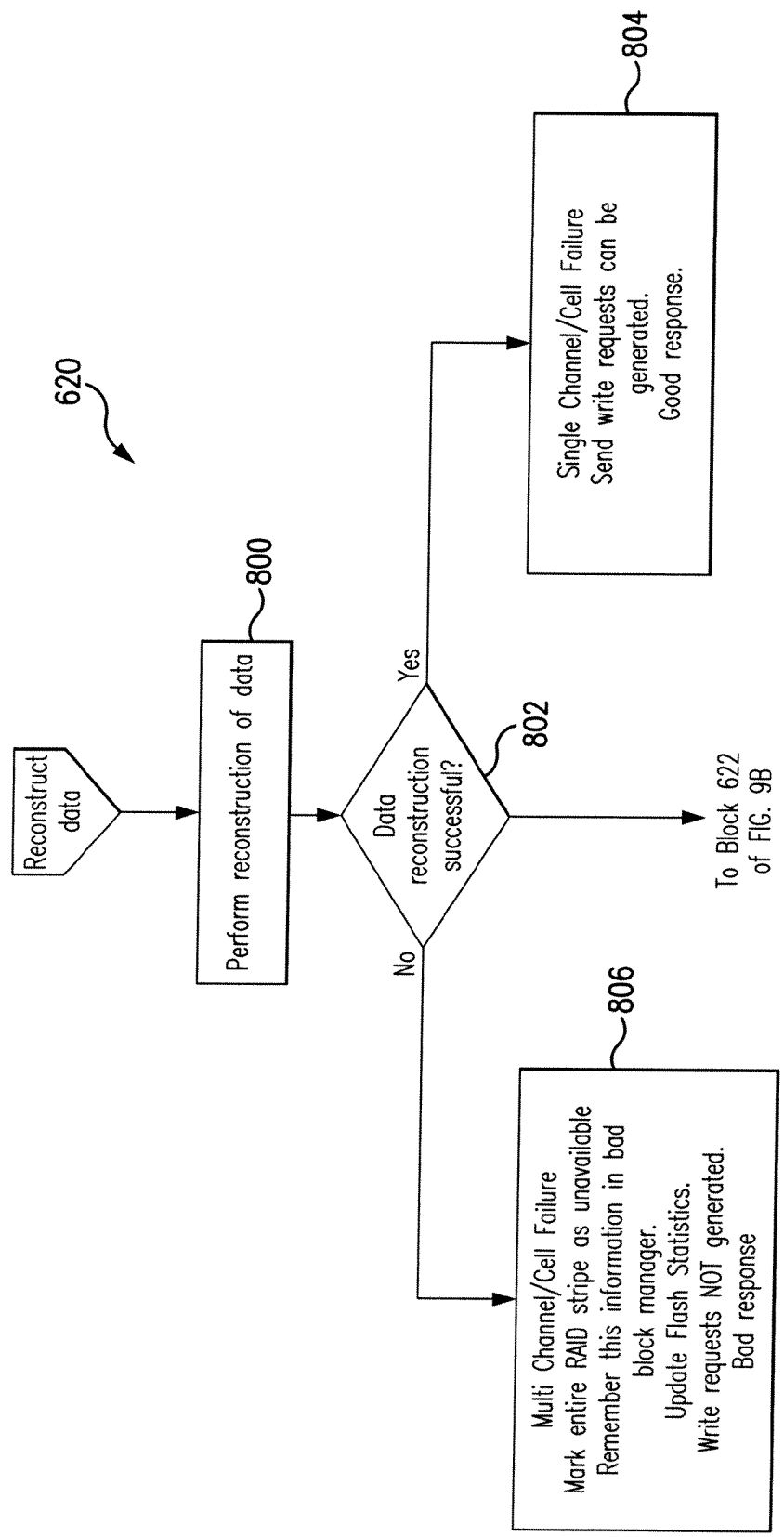
FIG. 11 is a flow-chart diagram of a "Data Reconstruction" process from medium errors for servicing "READ" requests.

The reconstruction process during servicing "read" request from computer/client node is presented in detail in FIG. 11. Upon performing the reconstruction of data in block 800, the logic flows to decision block 802 "Data Reconstruction Successful". When the reconstruction is successful the logic passes to block 804, the "write" request may be sent to the target storage for this data. If, however, the reconstruction process failed, the logic flows to block 806 to mark the entire RAID stripe as unavailable and to remember this information in the "bad" block manager. A determination is made that a multichannel/cell failure has occurred.

The results of the reconstruction success block 802 are sent to block 622 of FIG. 9B so that the software can make a decision whether to send the "write" request to the target storage controller or a no "write" request is generated.

Returning to FIGS. 8A-8B, after the most efficient command is build in block 504, if the response is "good" in block 508, the "write" requests are sent in block 510 to the target storage and the flash node waits for a response from the storage controller in block 514. The logic further flows from block 514 to logical block 516 "Is There a Response From Storage Controller?". When the response is not successful or is not received after a predetermined number of retries (decided in the logical block 518) the data for those "write"

requests stay in the flash node and is rescheduled for "write" to target storage at a later time in block 520.

If, however, the "write" request for the storage succeeds as determined in the decision block 522, then the logic flows to block 524 to update the statistics in the flash node indicating successful completion of the "write" operation. The logic further flows to decision block 528 where the flash management software checks if this was the last I/O request of the block. If this was the last "write" request in the block to the target storage, the flash management software flows to block 530 to issue the "erase" request for the complete block in block 530. Further, in block 532, the flash node management software forms operational flash block erase queue.

Figure 12:
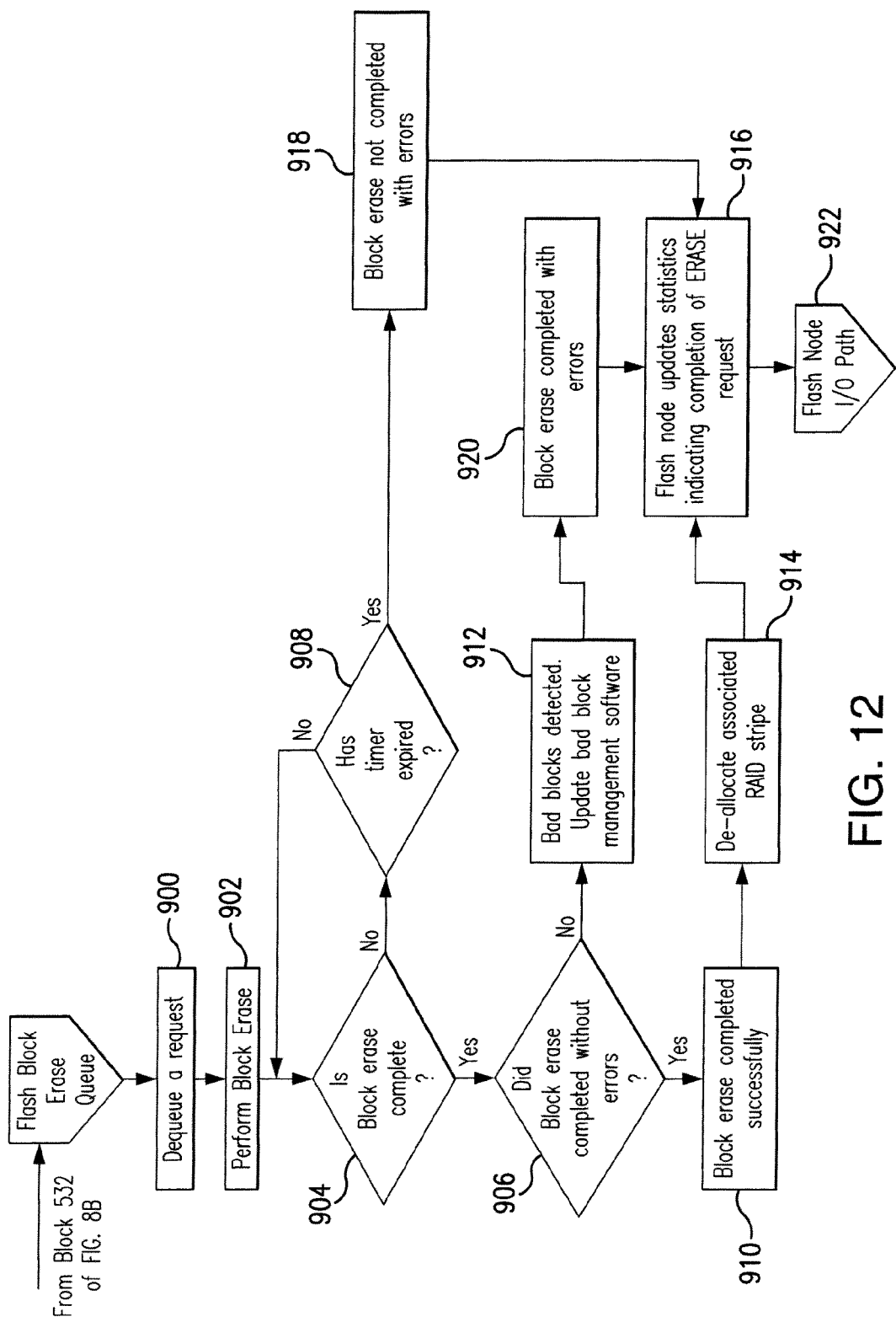
FIG. 12 is a flow-chart diagram for the intermediate data storage "erase" routine after successful "write" to the target disk.

The details of the flash block erasure after successful "write" to the storage controller are shown in FIG. 12 where the routine starts in block 900 where the request is de-queued from the flash block erase queue and the "Block Erase" operation is performed in block 902. The logic further flows to logical block 904 "Is Block Erase Complete?".

All the bits of the flash block are programmed to indicate erase of the block. So if the black erase is completed in 904, the logic flows to the logical block 906 "Did Block Erase Complete Without Errors?".

A timer is used to keep track of the time of the block erasure operation. If in block 904, it is determined that the block erase is not completed within the predetermined time, then the logic flows to block 908 "Has Timer Expired?". If the time expired, then the logic flows to block 918 "Block Erase Completed With Errors". If, however, the timer has not been expired in block 908, the logic loops to the block 904 to check again whether the block erase procedure has been completed.

From block 904 the logic flows to block 906 to check whether the block erase is completed without errors. If no errors have been found, the logic flows to block 910 "Block Erase Completed Successfully". If, however, in block 906 the block erase operation is not completed within the predetermined time for the operation, the flash node updates flash statistics indicating that the block erase is completed with errors and the logic flows to block 912 "Bad Blocks Detected", so that the "bad block" management software is updated. Further, the logic flows to block 920 "Block. Erase Completed With Errors". The RAID stripes associated with those blocks which are erased with errors are not de-allocated.

If the block erase is completed successfully in block 910, the associated RAID stripes are de-allocated in block 914, flash statistics are updated indicating completion of the erase request in block 916, and The metadata information is updated to indicate that the data is now in the target storage.

Figure 13:
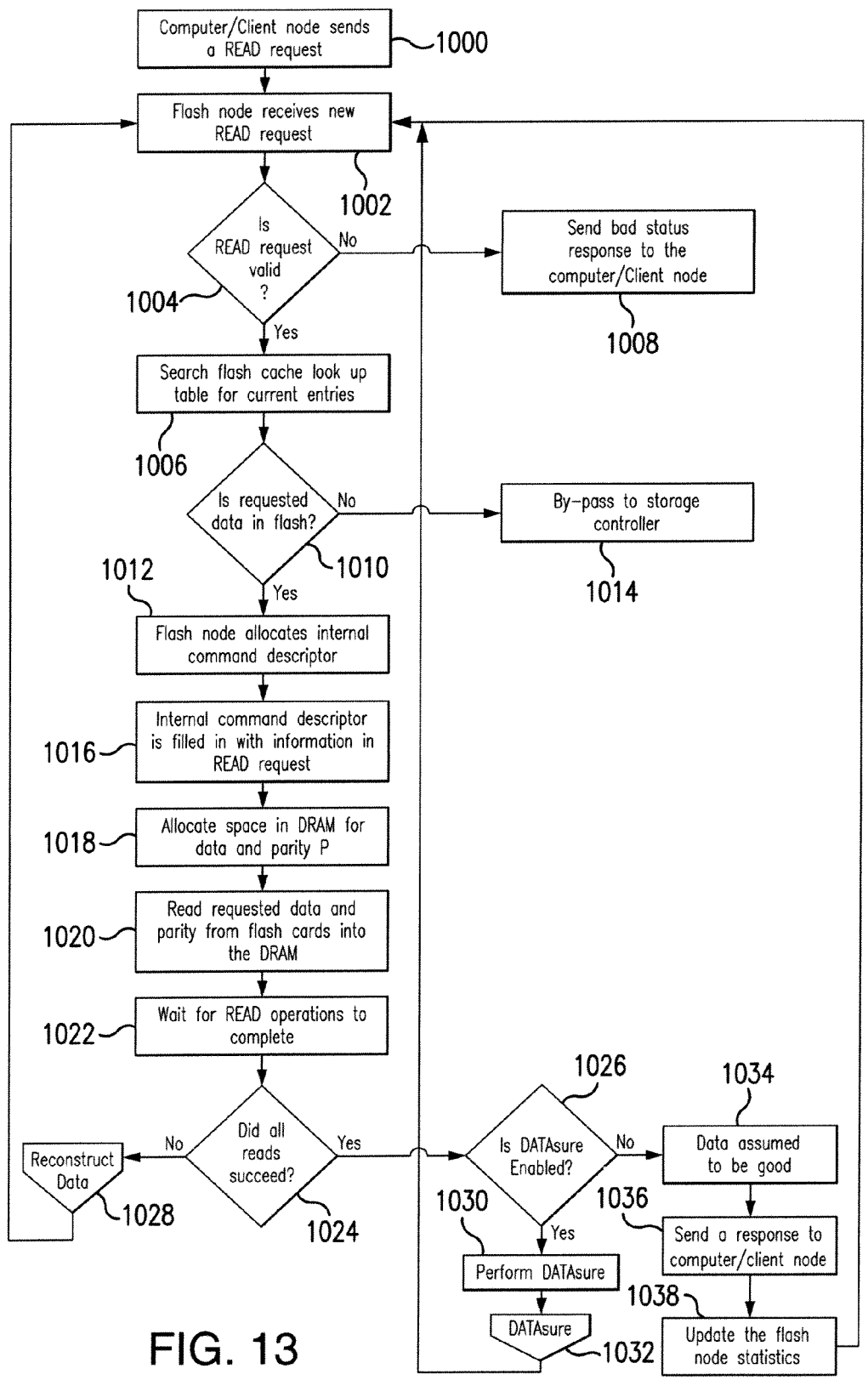
FIG. 13 is a flow-chart diagram of the servicing the "READ" requests issued by a data generating entity.

The present system 20 is also capable of servicing "read" requests front the computer nodes and/or client nodes 22. Referring to FIG. 13, such is the flow chart diagram of the operation of the software running on the intermediate data migration handling system 40 for servicing the "read" request. When the computer/client node 22 sends a "read" request in block 1000, the intermediate data migration handing system 40 receives the "read." request in block 1002, and the logic flows to the decision block 1004 "Is Read Request Valid?" to determine whether the request is indeed for the flash node to service.

If the validation in block 1004 fails, then the logic flows to block 1008 to send a "bad" response (status) to the computer/client node which issued the "read" request. If, however, the validity cheek succeeds, the logic flows to the block 1006 where the flash cache lookup table is traversed through the current entities to find a matching entry to this request. This operation is performed in the decision block 1010 "Is Requested Data in Flash?". If the matching emit to the request is found, it indicates that the data is in the flash card and the logic flows to block 1012 where the flash node allocates the internal command descriptor which is filled in with information from the read request in the block 1016.

If, however, in block 1010, the matching entry to the "read" request is not found in the flash cache, the logic considers that the data is in the target storage, and the "read" request is sent directly to the target controller (if the system is configured for the pass-through mode) for further processing in block 1014.

From block 1016, the logic flows to the block 1018. At this point the flash node management software allocates space in the DRAM for reading from the flash node the requested data D along with a parity value P information assuming that RAID D+P was used to protect data while writing to the flash node.

From block 1018, the procedure passes to block 1020 where the control software of the Node 0 of the data migration controller module 44 moves the data from the blocks in the flash cards from full RAID stripe into the allocated space in the DRAM. The logic further waits in block 1022 for the read operations to be completed. Once all operations are completed successfully in the decision block 1024, the logic flows to block 1026 "Is Datasure Enabled?".

If the Datasure process is enabled, the logic in block 1030 issues a command to perform Datasure routine. Further, the parity comparison is performed between the old parity P and new parity P in block 1032.

Datasure process performed in block 1032 is shown in FIG. 10 as described in previous paragraphs. The failure of the parity comparison means that the data is corrupted and the medium containing the data cannot be accessed. In this situation, the metadata information is updated and the data is marked as unavailable. At this point, a "bad" response is sent to the requesting computer node.

If in the decision block 1026, the Datasure feature is not enabled, then the logic flows to block 1034 "Data Assumed to be Good", and the "read" requests are serviced by flash node in block 1036. After sending the requested data to the computer/client node, the logic flows to block 1038 "Update the Flash Node Statistics", where the statistics are updated.

If in block 1024, the read operation into the DRAM does not completely succeed, then data is reconstructed in block 1028, if possible, as in case of single component failure for RAID D+P. If the RAID D+P1+P2 calculations were performed instead of RAID D+P, then the data can be reconstructed if any two channels or cells fail. If data reconstruction fails, then the data is marked as unavailable for the use in metadata information, and a "bad" response is sent to the requesting computer/client node. The flow chart describing the data reconstruction routine during the read request is presented in FIG. 11 and has been described supra herein.

Returning to FIG. 4, a RAID/Flash Controller (RFC) 1200 incorporates the FPGA units 64 and 70, and resides on the storage flash card 48. The RFC 1200 hosts the stage buffer memories between the host interfaces and the Flash Memory 72, as will be presented in detail in future paragraphs.

Figure 14:
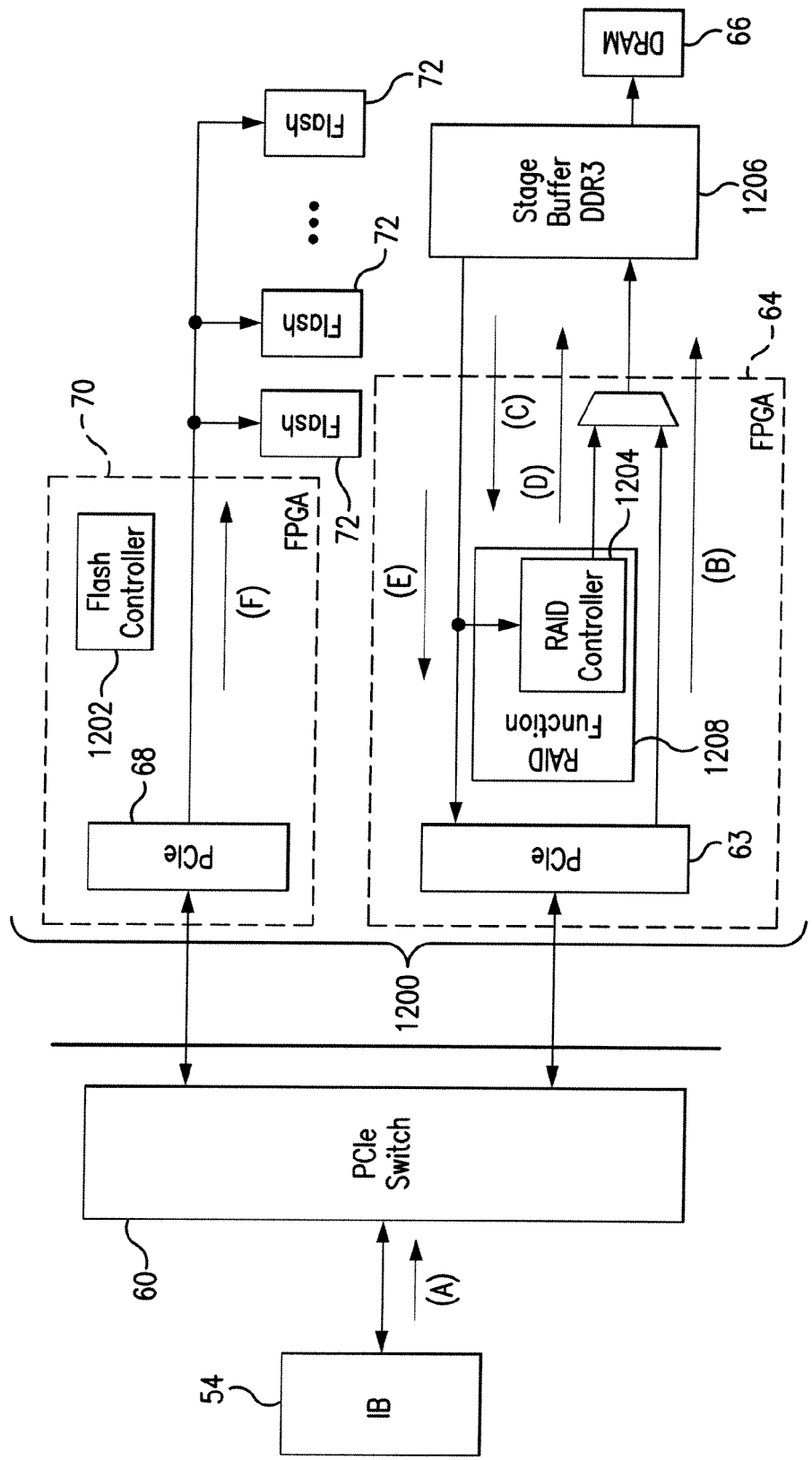
FIG. 14 is a block diagram representing data flow for RAID parity generation supported by RAID/Flash Controller (FPGA) in the system of the present invention.
Figure 15A:
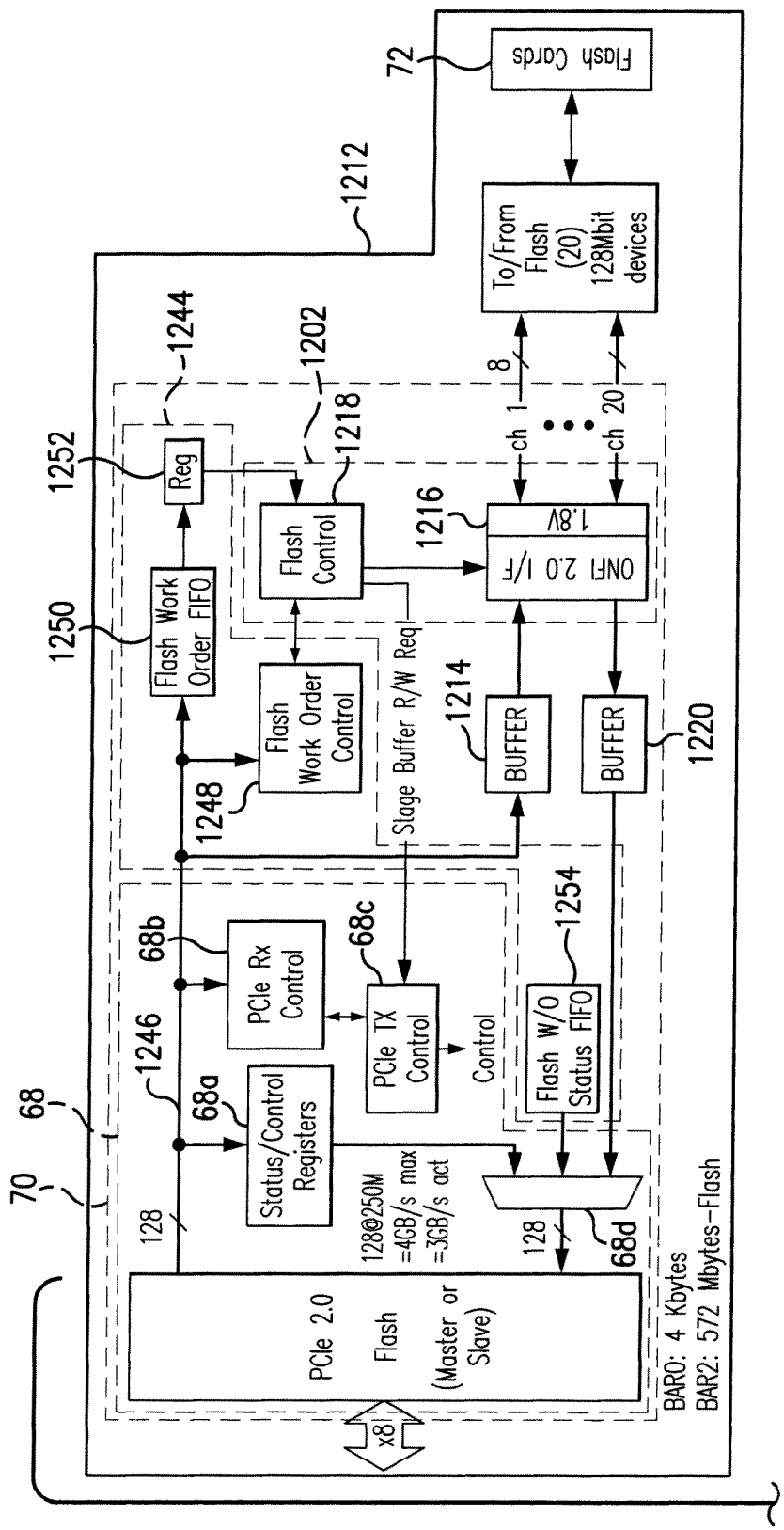
FIGS. 15A-15B represent a functional block diagram of the RAID/Flash Controller in the system of the present invention.
Figure 15B:
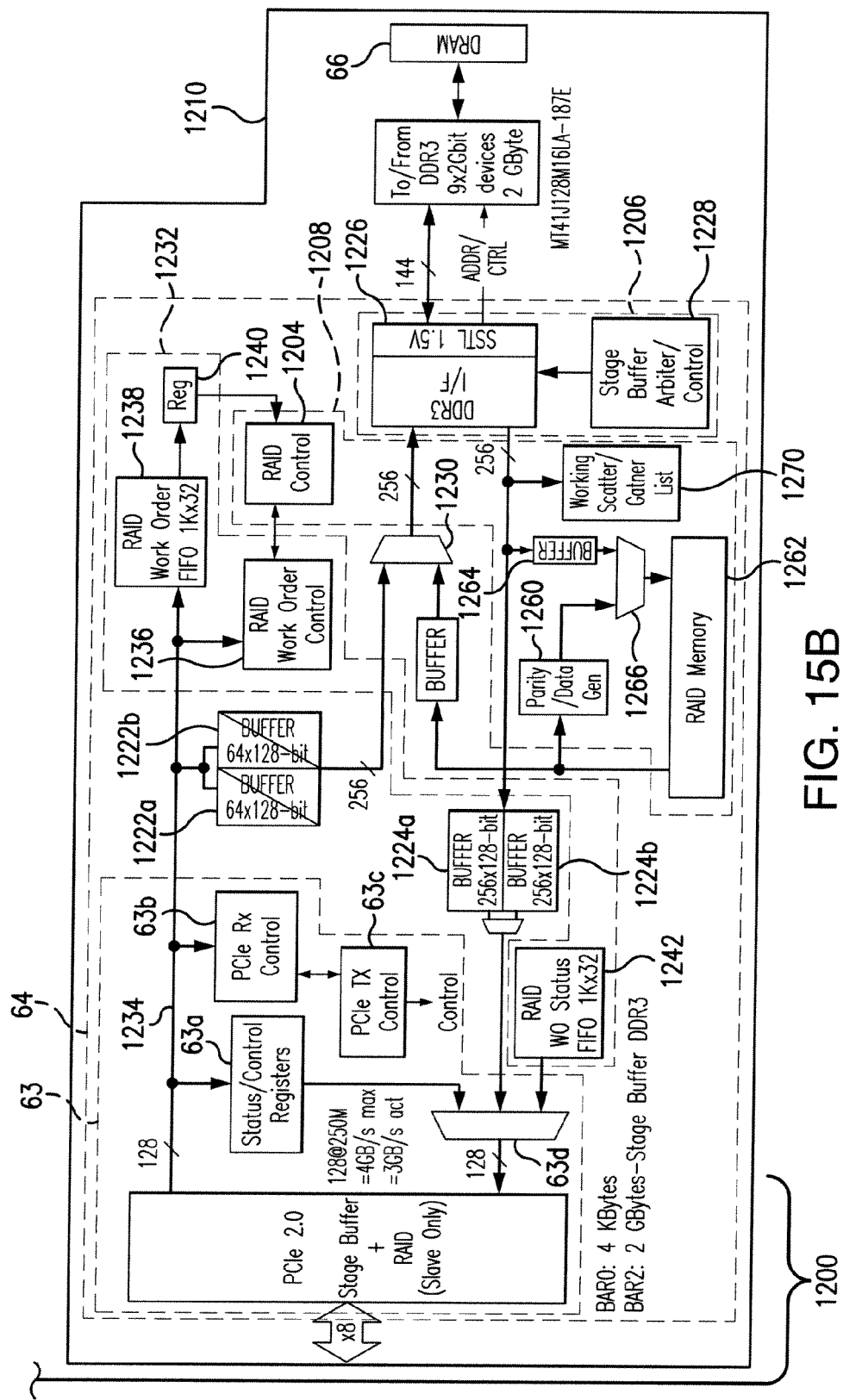

As presented in FIGS. 14 and 15A-15B, data is transferred between the host interfaces 54 and the Flash Controller 1202 in the FPGA 70 via the 8-lane PCI Express 2.0 interface 68. The data is transferred from a RAID Controller 1204 in the FPGA 64 via the 8-lane PCI Express 2.0 interface 63.

Specifically, as shown in FIG. 14, data flows A and B represent the transfer of data from the IB host interface 54 to a stage buffer 1206 (to be detailed further herein) for storage in the DRAM 66.

The data flow C represents data read from the stage buffer 1206 into a RAID function 1208 (to be described in detail in further paragraphs) for processing. The data flow D represents RAID parity data written into the stage buffer 1206 per Work Order requests, as will be described infra herein. The data flows E and F represent data read from the stage buffer 1206 which is transferred to the Flash Controller 1202 via the PCI Express 2.0 interfaces 63 and 68 as requested by the Flash Controller 1202.

As presented in detail in FIGS. 15A-15B, the RAID/Flash Controller 1200 includes two functional sections, e.g., (1) the RAID/stage buffer function 1210 corresponding to the FPGA portion 64, and (2) the Flash Controller function 1212 corresponding to the FPGA 70. Each function 1210 and 1212 uses its own PCI Express 2.0 interface, e.g., the PCI Express (PCIe) 2.0 Interface 68 for the Flash Controller function 1212, and the PCIe 2.0 Interface 63 for the RAID/stage buffer function 1210, respectively.

As shown in FIGS. 15A-15B, the status/control registers 68a, PCIe RX control unit 68b, PCIe TX control unit 68c, and Multiplexer 68d form the user interface to the PCI Express 2.0 function 68 within the FPGA 70.

A hardware buffer 1214 is used for transferring the data flow to the ONFI 2.0 interface 1216 which, together with the flash control function 1218, form the Flash Controller 1202 of the RFC 1200. The buffer 1220 is used for buffering data from the ONFI 2.0 interface 1216 to the PCIe 2.0 flash interface 68.

The user interface to the PCI Express 2.0 function 63 within the FPGA 64, is formed by the status/control registers 63a, PCIe RX control 63b, PCIe TX control 63c, Multiplexer 63d, and Multiplexer 63e.

Further in the RAID/storage buffer 1210, the hardware buffer labeled 1222a and 1222b is used for data flow to the stage buffer module 1206. As presented in FIGS. 15A-15B, the stage buffer 1206 has the DDR interface unit 1226 and stage buffer arbiter/control 1228. Hardware buffer 1224a and hardware buffer 1224b are used for buffering data from the DDR3 interface 1226 of the stage buffer 1206 to the PCIe 2.0 RAID interface 63. Multiplexer 1230 selects the data coming from the RAID PCIe interface 63 or the parity generation unit 1260.

Work Order Interface function 1232 issues commands to control the RAID function 1204. The Work Order Interface 1232 is accessed by the data generated entity via the 8-lane PCI Express 2.0 bus 1234. The Work Order Interface 1232 is composed of RAID Work Order Control Unit 1236. RAID Work Order FIFO 1238, Register 1240, and the RAID Work Order Status FIFO 1242.

The Work Order commands to control the flash function in the FPGA 70 are handled by a Work Order Interface 1244 that is accessed via an 8-lane PCI Express 2.0 bus 1246. The Work Order interface 1244 is composed of Flash Work Order Control Unit 1248, Flash Work Order FIFO 1250, Register 1252, and the Flash Wok Order Status FIFO 1254. Data between the Flash Memory 72, the RAID Controller 1204, and Hash Controller 1202 is transmitted via multiple ONFI 2.0 interfaces 1216 running at 250 mHz.

Work Order commands to control the flow of data to/from the Flash Memory 72 are handled by the Work Order Interface 1248 that is accessed via the 8-lane PCI Express 2.0 bus 1246.

The Stage Buffer Module 1206 is implemented using DDR3 interface 1226 interconnected with the DRAM 66. The Stage Buffer operates at 333 MHz. RAID/stage buffer function carried out by the FPGA 64 includes the following functions:
PCI Express 2.0 x8 Lane Interface—RAID/Stage Buffer 1210

The RAID/Stage Buffer function 1210 contains the 8-Lane PCI Express 2.0 endpoint interface 63. The Host Interfaces 54 issue "read" and "write" commands to the Stage Buffer Memory 66 through the interface 63. RAID Work Orders 1232 are also received through the interface 63.
BAR0 Status/Control Registers for 68a and for 63a, Work Orders Internal status and control registers 63a, as well as the RAID Work Order Interface 1232 are memory mapped to BAR0. BAR0 is configured as a 64-bit Address/32 bit Data function with a total size of 4096 Bytes. All transactions to BAR0 are 1-DW in length. Requests not adhering to this requirement are flagged as "Unsupported".
BAR2 DDR3 Stage Buffer Memory The Stage Buffer Memory 66 is memory mapped to BAR2. BAR2 is configured as a 64-bit addressable function with a total size of 2 GBytes. All transactions to/from this function must be in even multiples of 512-Bytes. Requests not adhering to this requirement are flagged as "Unsupported".
Stage Buffer Module 1206

The RFC 1200 is responsible for accepting the Stage Buffer memory 66 requests from both the Host (IB) I/F and the RAID Controller 1204 and executing those requests to the Stage Buffer memory 66. When conflicts occur, the Stage Buffer Arbiter/Controller 1228 must arbitrate PCIe and RAID Accesses to the Stage Buffer Memory 66. Additionally, the DDR3 devices 1226 require periodic refresh cycles. The DDR3 I/F 1226 is responsible for executing these refresh commands at the proper time. The DDR3 devices require a refresh cycle every 7.8 us.
Memory Devices 66

The DDR3 device 1226 used ID implement the Stage Buffer memory 66 is MT41J128M16LA-187E. Each memory is 128M×16-bits. Nine devices are organized to implement a 128M×144 Stage Buffer memory (2-GBytes+ECC).
Work Order Interface 1236 for RAID FPGA 64

Work Order messages are used to control the RAID function. The RFC 1200 receives the Work Order messages from the RAID PCI Express Interface 63. Work Orders are placed into a RAID Work Order FIFO 1238 for processing. Each RAID Work Order consists of x32-bit words.

Additionally, a RAID Work Order Readback Status FIFO 1242 holds the completion status of each submitted Work Order as defined by the Work Order Code Response.
Work Order Interface 1244 for Flash FPGA 70

Work Order messages are used to control the FLASH function 70 using Flash Work Order Control 1244. The RFC 1200 receives these Work Order messages from the data generating entities via the FLASH PCI Express Interface 70. The FLASH Work Orders are placed in the Flash Work Order FIFO 1250 for processing. The FLASH Work Order Readback Status FIFO 1254 holds the completion status of each submitted Work Order as defined by the Work Order code Response.
RAID Function The hardware has logical blocks shown as Parity/Data Generation Unit 1260 to perform the RAID operations. The RAID Memory 1262 is hardware memory used for performing RAID operations. The Hardware Buffer 1264 is used for buffering data from the DDR3 Interface 1226 on which RAID operation will be performed. The Multiplexer 1266 is used to select between the data from the DDR3 I/F 1226 and from the Parity/Data Generation Unit 1260, before it is written to the RAID Memory 1262.

Figure 16:
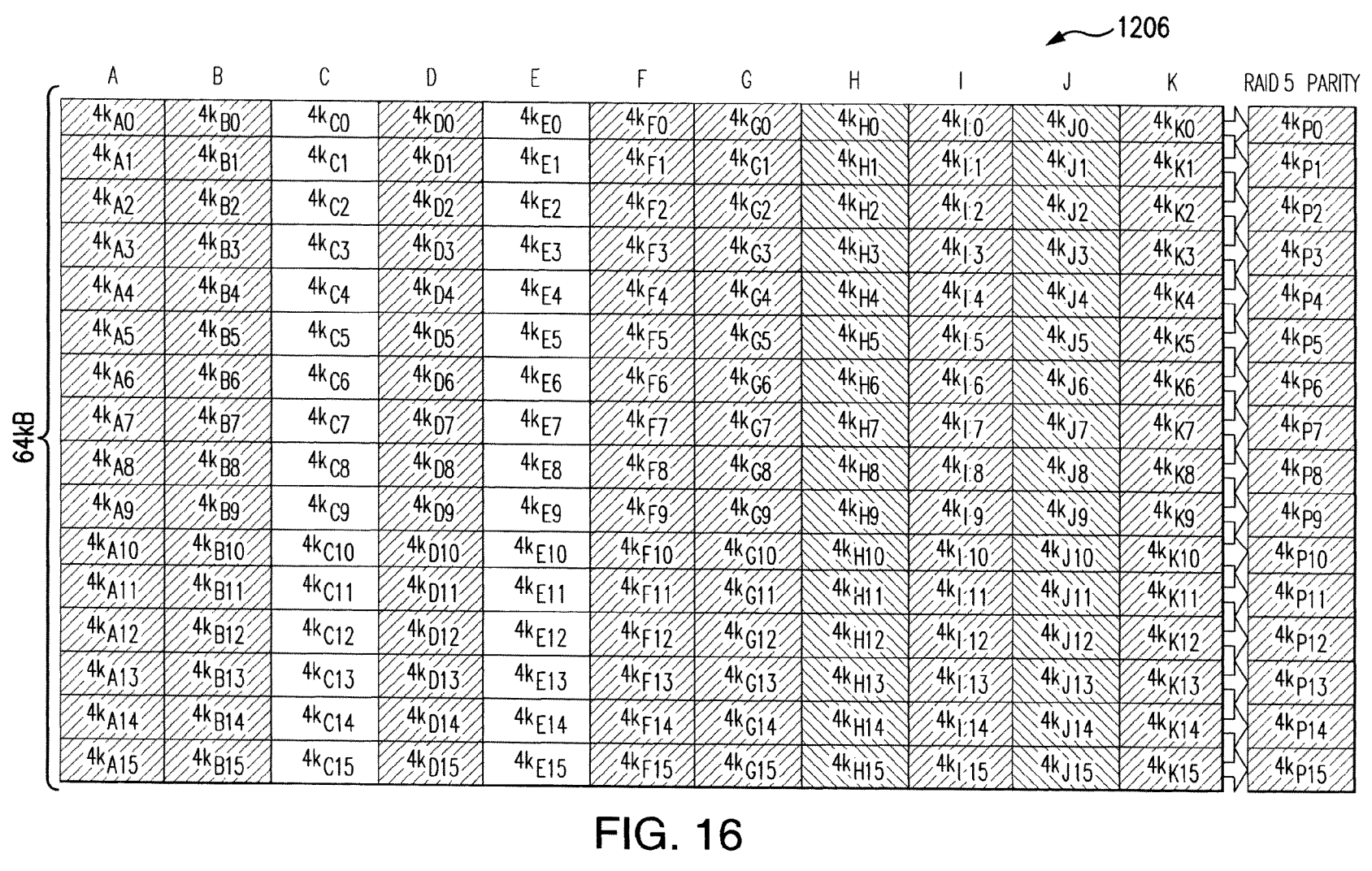

Data are striped in 64 kByte blocks across 11 Flash Memory 72 cards in an 11+1 RAIDS configuration, as shown in FIG. 16. Parity is distributed across all cards 72.

In accordance with the RAID principles, data are placed into the stage buffer Memory 66 in a fragmented fashion via the PCI Express 2.0 interface 63, as presented in FIG. 17A-17C. As shown in FIG. 17A, Stage Buffer data are fragmented into blocks which may vary in size.

Additionally, a Scatter/Gather Pointer List 1270 is placed into the Stage Buffer 1206/DRAM 66 to define how to reconstruct the fragmented data in the proper order. In operation, the Work Orders are submitted to the RFC 1200 conveying the location of the Scatter/Gather Pointer Lists. The RAID function uses the Scatter/Gather Pointer List 1270 to locate and process data in the Stage Buffer 1206 for parity/RAID generation 1260, with the parity stripe written back to the Stage Buffer 1206 according to the Parity Pointer list 1270. As shown in FIG. 17B, the Work Order calls out the starting address of the Scatter/Gather pointer list.

The Scatter/Gather Pointer List 1270 breaks down each 64 kB stripe into (16) 4 kB subblocks by providing pointers to where each 4 kB sub-block resides in the Stage Buffer Memory (DRAM) 66. Thus, as shown in FIG. 17C, 16 pointers define a 64 kB block stripe. Each list entry holds a pointer to a 4 kB sub-block in Stage Buffer memory.

The Scatter/Gather Pointer List 1270, as shown in FIG. 17B, specifies the unfragmented 64 kB data block as an ordered set of (16) data block pointers. The 4 kB data blocks can then be located and processed in the correct order. The list must also specify where generated parity should be placed. Total number of entries in a pointer list is defined as 12×16=192 Pointers.

The system and method for data migration between computer cluster architectures (computer nodes, client nodes, file servers) and data storage devices in the form of the RAID storages, as described in previous paragraphs, permits aggregation and organization of the data transfers to the RAID storage in a manner that is most efficient for the target storage devices independently of the highly randomized input/output activity of the computer cluster architectures due to inclusion of the intermediate data migration handling system between the data generating entity and data storage disks. The intermediate data migration handing system includes an intermediate data storage module and a data controller module controlling the data migration through the intermediate data storage module.

The attained bandwidth maximization, target storage power consumption minimization, due to exploitation of the target storage devices in the most optimal manner, is combined in the present system with data reliability and integrity which are attained due to the capability of the subject system of performing RAID calculations over the random data egressed from the high speed computer nodes before storing the data.

The RAID protection provided in the present system results in a high tolerance to failure and preserves the computer nodes data integrity. The RAID calculations are performed on all ingress data from the computer nodes into the intermediate data storage module, and are used on the egress data from the intermediate data storage module to the target storage for data reconstruction and data integrity checking when desired.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular applications of elements may be reversed or interposed, all without departing from the spirit or scope of the invention as defined in the appended claims.

What is claimed is:

1. A system for data migration between at least one data generating entity and at least one array of data storage units, wherein said at least one array of data storage units is controlled by a storage controller, said system comprising:
    an intermediate data migration handling system installed between said at least one data generating entity and said at least one array of data storage units to decouple data transfers to said data storage units of said at least one array thereof from an input/output activity of said at least one data generating entity,
    said intermediate data migration handling system including:
    at least one intermediate data storage module operatively coupled to said at least one data generating entity to store data received therefrom, and
    at least one data migration controller module operatively coupled between said at least one intermediate data storage module and said at least one array of data storage units to control data transfers therebetween,
    wherein said system is configured to operate in a transfer mode and in a pass-through mode,
    wherein said at least one data migration controller module includes said storage controller of said at least one array of data storage units, a data storage management unit operatively coupled between said at least one intermediate data storage module and said storage controller, and an efficiency check module residing in said intermediate data migration handling systems in an operative interconnection with said data storage management unit,
    wherein said efficiency check module is configured to compare a request size received from said at least one data generating entity with an available space in said intermediate data, storage module, and
    wherein said data storage management unit is configured to switch said system to said pass-through mode if said request size is larger than said available since said intermediate data storage module, said at least one data migration controller module being configured to pass data output from said at least one data generating entity directly to said at least one designated data storage unit in said pass-through mode, and
    wherein said data storage management unit is further configured to generate requests for data transfers between said at least one intermediate data storage module and at least one designated data storage unit of said at least one array of data storage units in said transfer mode substantially independent of the input/output activity of said at least one data generating entity based on predetermined conditions of said intermediate data migration handling system and said at least one array of data storage units.

2. The system of claim 1, wherein said predetermined conditions are selected from the group consisting of:
    fullness of said at least one intermediate data storage module, time elapsed since a previous data transfer thereto, minimization of usage of the data storage units, minimization of seeking time for each data storage unit, and data transfer priority.

3. The system of claim 1, wherein said at least one intermediate data storage module includes a storage modular enclosure and a plurality of data storage cards housed in said storage modular enclosure, said intermediate data storage module further including:
- at least one front end interface coupling a respective at least one of said plurality of data storage cards to said at least one data generating entity, and
- at least one back end interface coupling said respective at least one data storage card to said at least one data migration controller module.

4. The system of claim 3, wherein said at least one front end interface and said at least one back end interface support a data transfer protocol selected from a group consisting of: Fibre Channel (FB), Infiniband (IB), and Gigabit Ethernet (GigE) protocols.

5. The system of claim 4, wherein each of said plurality of data storage cards includes a Dynamic Random Access Memory (DRAM) block and a Flash Memory Unit, including a Non-Volatile Random Access Memory (NVRAM) block, said DRAM block being operatively coupled between said at least one data generating entity and said NVRAM block, and wherein the data is stored in said NVRAM block or read therefrom through said DRAM block in accordance with a request received at said DRAM block from said at least one data generating entity.

6. The system of claim 5, further comprising a Field-Programmable Gate Array (FPGA) Controller residing on each of said plurality of data storage cards and operatively coupled to said at least one data generating entity through said at least one front end interface, said FPGA Controller including a Flash FPGA Controller Unit and a Redundant Arrays of Independent Disks (RAID) FPGA Controller unit, wherein said Flash FPGA Controller unit is operatively coupled between said at least one data generating entity and said Flash Memory Unit, and wherein said RAID FPGA Controller is operatively coupled between said at least one data generating entity and said DRAM block.

7. The system of claim 6, wherein said Flash FPGA Controller Unit includes, at a front end thereof, a first PCIe Interface Unit coupled to said at least one front end interface of said at least one data storage card, a Flash Control block operatively coupled to said Flash Memory Unit, at an input thereof, a first Work Order Interface Unit coupled, at an input thereof, to said first PCIe interface unit and, at an output thereof, to said Flash Control block to command the data flow to from said Flash Memory Unit, as requested by said at least one data generating entity.

8. The system of claim 7, wherein said RAID FPGA Controller Unit includes, at a front end thereof, a second PCIe interface unit coupled to said at least one front end interface of said at least one data storage card, an RAID operation block operatively coupled to said DRAM, and a second Work Order Interface Unit operatively coupled between said second PCIe interface unit and said RAID operation block to command the data flow to/from said DRAM, as requested by said at least one data generating entity.

9. The system of claim 8, wherein said RAID operation block includes Parity/Data Generation Unit, RAID memory, and a Scatter/Gather Pointer List,
- wherein RAID Parity Data are written from said Parity/Data Generation Unit into said DRAM as instructed by said second Work Order Interface Unit,
- wherein data read from said DRAM are transferred to said Flash Control block via said first and second PCIe interfaces upon a request issued by said Flash Control Unit,
- wherein data are striped across a plurality of Flash memory cards in said Flash memory block,
- wherein said Scatter/Gather Pointer List is placed into said DRAM to define how to reconstruct fragmented data in said DRAM, and
- wherein said RAID operation block locates and processes said RAID Parity data in said DRAM as specified by said Scatter/Gather Pointer List.

10. A The system of claim 3, further comprising at least one redundant said at least one data migration controller module operatively coupled to said at least one intermediate data storage module through an additional at least one back and interface.

11. The system of claim 5, wherein said at least one data migration controller module further includes a controller modular enclosure, said data storage management unit and said storage controller being housed in said controller modular enclosure, wherein said data storage management unit is operatively coupled to said intermediate data storage module and is configured to control data writing in said intermediate data storage module and data flushing therefrom.

12. The system of claim 11, wherein said at least one data migration controller module further includes a virtualized Redundant Array of Independent Disks (RAID) unit contained in said controller modular enclosure in operative connection with said intermediate data storage module and said data storage management unit, wherein said RAID unit is configured to apply RAID calculations to data ingress from said at least one data generating entity prior to writing said data in said intermediate data storage module.

13. The system of claim 12, wherein said virtualized RAID unit maintains a search information on the data saved in said Flash Memory Unit.

14. The system of claim 11, wherein said data migration controller module further includes a timer unit coupled to said data storage management unit, said timer unit determining an elapsed time since a previous data transfer from said at least one data generating entity, and wherein said data storage management unit issues a data flushing command from said intermediate data storage module upon receipt of a signal from said timer unit.

15. The system of claim 12, wherein said virtualized RAID unit generates parity value for said data, allocates space in said DRAM block for said data and said parity values, and performs said data RAID stripping prior to storing said data into said Flash Memory Unit.

16. The system of claim 13, wherein said virtualized RAID unit further comprises a data reconstruction unit, said data reconstruction unit retrieves redundant data stored in said Flash Memory Unit using said search information, and applies said redundant data to repair corrupted data or to replace lost data in said intermediate data storage module.

17. The system of claim 12, wherein said at least one array of data storage units has an RAID storage structure, and wherein said virtualized RAID unit corresponds to said RAID storage structure.

18. The system of claim 5, wherein said data storage management unit further comprises an efficient command building unit coupled to said Flash Memory Unit and sorting metadata information on said data stored therein to build the most efficient "write" command to said at least one designated data storage unit based on a criteria selected from the group consisting of: flash priority, data storage usage minimization, seek time reduction, and generation of an optimal I/O activity for said at least one designated data storage unit.

19. A method for data migration between at least one data generating entity and a plurality of data storage units, comprising the steps of:

(a) operatively coupling an intermediate data storage module to said at least one data generating entity;

(b) operatively coupling at least one data migration controller module between said intermediate data storage module and said plurality of data storage units, said at least one data migration controller module including a data storage management unit and a storage controller for said plurality of data storage units;

(c) sending a "write" request from said at least one data generating entity to said intermediate data storage module during an Input/Output (I/O) cycle of said at least one data generating entity;

(d) performing a validity check for said "write" request;

(e) generating, at said data storage management unit, parity values P for data D;

(f) allocating, at said data storage management unit, space in said intermediate data storage module for said data D and parity values P;

(g) writing, at said data storage management unit, said data D and parity values P in said allocated space in said intermediate data storage modulo;

(h) switching said at least one data generating entity to a compute state thereof;

(i) upon meeting predetermined conditions, building, at said data storage management unit, a command for a most efficient data transfer from said intermediate data storage module to said plurality of data storage units, performing integrity check for the data D and P stared in said intermediate data storage module and reconstructing said data D if corrupted or lost;

(j) sending, from said data storage management unit, another "write" request to said storage controller of a target data storage unit; and (k) flushing said data D from said intermediate data storage module to said target data storage unit of said plurality thereof upon receipt of permitting signal from said storage controller.

20. The method of claim 19, further comprising the steps of:

prior to said step (e), performing an efficiency check by comparing a length of said "write" request to a predefined length for efficiency and checking an availability of memory space in said intermediate data storage module for said "write" request, searching said intermediate data storage module for matching request, and creating metadata entry, if said memory space is available, and switching to a pass-through mode, thereby passing said "write" request directly to said storage controller of said plurality of data storage units, if said memory space is not available, or if said "write" request is shorter then said predefined length for efficiency.

21. A method for data migration between at least one data generating entity and a plurality of data storage units, comprising the steps of:

(a) operatively coupling an intermediate data storage module to said at least one data generating entity;

(b) operatively coupling at least one data migration controller module between said intermediate data storage module and said plurality of data storage units, said intermediate data storage module it eluding a data storage management unit and a storage controller for said plurality of data storage units;

upon receiving a "write" request from said at least one data generating entity to said intermediate data storage module during an Input/Output (I/O) cycle of said at least one data generating entity:

(c) performing an efficiency check by comparing a length of said "write" request to a predefined length for efficiency and checking an availability of memory space in said intermediate data storage module for said "write" request;

(d) searching said intermediate data storage module for matching request, and creating metadata entry, if said memory space is available, and (e) switching to a pass-through mode, thereby passing said "write" request directly to said storage controller of said plurality of data storage units, if said memory pace in said intermediate data storage module is not available, or if said "write" request is shorter then said predefined length for efficiency; and upon receiving a "read" request from said at least one data generating entity to said intermediate data storage module for a requested data:

(f) searching, by said data storage management unit, said intermediate data storage module for said requested data, and (g) by-passing said "read" request to said storage controller if at least a portion of said requested data is absent from said intermediate data storage module.

* * * * *